(12) United States Patent
Acharya et al.

(10) Patent No.: US 12,182,017 B2
(45) Date of Patent: Dec. 31, 2024

(54) DATABASE MANAGEMENT FOR MODIFYING DATA RELATED TO INDUSTRIAL ASSETS USING AN INTELLIGENT DATA QUEUE FOR DATA INGESTION

(71) Applicant: HONEYWELL INTERNATIONAL INC., Charlotte, NC (US)

(72) Inventors: Bhabesh Chandra Acharya, Bangalore (IN); Jyoti Ranjan Senapati, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 82 days.

(21) Appl. No.: 18/194,315

(22) Filed: Mar. 31, 2023

(65) Prior Publication Data

US 2024/0330180 A1 Oct. 3, 2024

(51) Int. Cl.
*G06F 12/0802* (2016.01)
*G06F 16/25* (2019.01)

(52) U.S. Cl.
CPC ........ *G06F 12/0802* (2013.01); *G06F 16/254* (2019.01); *G06F 2212/60* (2013.01)

(58) Field of Classification Search
CPC . G06F 12/0802; G06F 16/254; G06F 2212/60
See application file for complete search history.

(56) References Cited

U.S. PATENT DOCUMENTS

| | | | |
|---|---|---|---|
| 11,516,069 B1* | 11/2022 | Satish | H04L 43/067 |
| 2018/0246944 A1* | 8/2018 | Yelisetti | G06F 16/258 |
| 2019/0138638 A1* | 5/2019 | Pal | G06F 16/285 |
| 2021/0064250 A1* | 3/2021 | Neff | G11B 5/00813 |
| 2021/0096551 A1* | 4/2021 | Sayyarrodsari | G06Q 10/06395 |

* cited by examiner

*Primary Examiner* — Angelica Ruiz
(74) *Attorney, Agent, or Firm* — Alston & Bird LLP

(57) ABSTRACT

Various embodiments relate to managing a database to modify data related to industrial assets using an intelligent data queue for data ingestion. Embodiments are configured to receive a data modification payload associated with a request to modify a portion of data stored in a time series database. Embodiments are also configured to parse the data modification payload to identify a type of modification with respect to the data stored in the time series database. Embodiments are also configured to store the data modification payload in at least one of a first data cache configured for storing pending data modification payloads and a second data cache configured for processing data modification payloads. In response to a determination that the data modification payload is stored in the second data cache, the data stored in the time series database is modified based at least in part on the type of modification.

20 Claims, 13 Drawing Sheets

PROCESSING PENDING TASKS IN DATA CACHE

FIG. 11

DATABASE MANAGEMENT FOR MODIFYING DATA RELATED TO INDUSTRIAL ASSETS USING AN INTELLIGENT DATA QUEUE FOR DATA INGESTION

TECHNICAL FIELD

The present disclosure generally relates to digitally transforming data related to industrial assets in an industrial environment, and more particularly to managing data processing pipelines for streaming data related to industrial assets.

BACKGROUND

An industrial environment generally includes physical assets such machines, sensors, equipment, computing devices, and/or other types of industrial assets configured to execute one or more industrial processes. These industrial assets typically generate, calculate, collect, and/or otherwise obtain various types of data related to the one or more industrial processes and output the data in a raw streaming format to one or more computing devices and/or one or more storage devices associated with an industrial enterprise related to the industrial environment. However, Applicant has discovered many technological inefficiencies related to traditional methods directed towards contextualizing raw industrial data.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors and a memory having program code stored thereon. The program code, in execution with the at least one processor, causes the system to receive a data modification payload associated with a request to modify one or more portions of asset data stored in a time series database. In one or more embodiments, the asset data digitally represents one or more assets within an industrial environment. In one or more embodiments, the program code, in execution with the at least one processor, also causes the system to parse the data modification payload to identify a type of modification with respect to the asset data stored in the time series database. In one or more embodiments, the program code, in execution with the at least one processor, also causes the system to store the data modification payload in at least one of a first data cache configured for storing pending data modification payloads and a second data cache configured for processing data modification payloads. In one or more embodiments, in response to a determination that the data modification payload is stored in the second data cache, the program code, in execution with the at least one processor, also causes the system to modify, based at least in part on the type of modification, the asset data stored in the time series database to facilitate one or more asset data queries for the one or more assets via the time series database.

In another embodiment, a computer-implemented method is provided. The computer-implemented method provides for receiving a data modification payload associated with a request to modify one or more portions of asset data stored in a time series database. In one or more embodiments, the asset data digitally represents one or more assets within an industrial environment. In one or more embodiments, the computer-implemented method also provides for parsing the data modification payload to identify a type of modification with respect to the asset data stored in the time series database. In one or more embodiments, the computer-implemented method also provides for storing the data modification payload in at least one of a first data cache configured for storing pending data modification payloads and a second data cache configured for processing data modification payloads. In one or more embodiments, in response to a determination that the data modification payload is stored in the second data cache, the computer-implemented method also provides for modifying, based at least in part on the type of modification, the asset data stored in the time series database to facilitate one or more asset data queries for the one or more assets via the time series database.

In yet another embodiment, a computer program product comprises at least one non-transitory computer-readable storage medium having computer-readable program code portions stored therein. The computer-readable program code portions comprise an executable portion configured to receive a data modification payload associated with a request to modify one or more portions of asset data stored in a time series database. In one or more embodiments, the asset data digitally represents one or more assets within an industrial environment. In one or more embodiments, the computer-readable program code portions also comprise an executable portion configured to parse the data modification payload to identify a type of modification with respect to the asset data stored in the time series database. In one or more embodiments, the computer-readable program code portions also comprise an executable portion configured to store the data modification payload in at least one of a first data cache configured for storing pending data modification payloads and a second data cache configured for processing data modification payloads. In one or more embodiments, in response to a determination that the data modification payload is stored in the second data cache, the computer-readable program code portions also comprise an executable portion configured to modify, based at least in part on the type of modification, the asset data stored in the time series database to facilitate one or more asset data queries for the one or more assets via the time series database.

BRIEF DESCRIPTIONS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 11 illustrates an exemplary second data cache, in accordance with one or more embodiments described herein;

DETAILED DESCRIPTION

Figure 1:
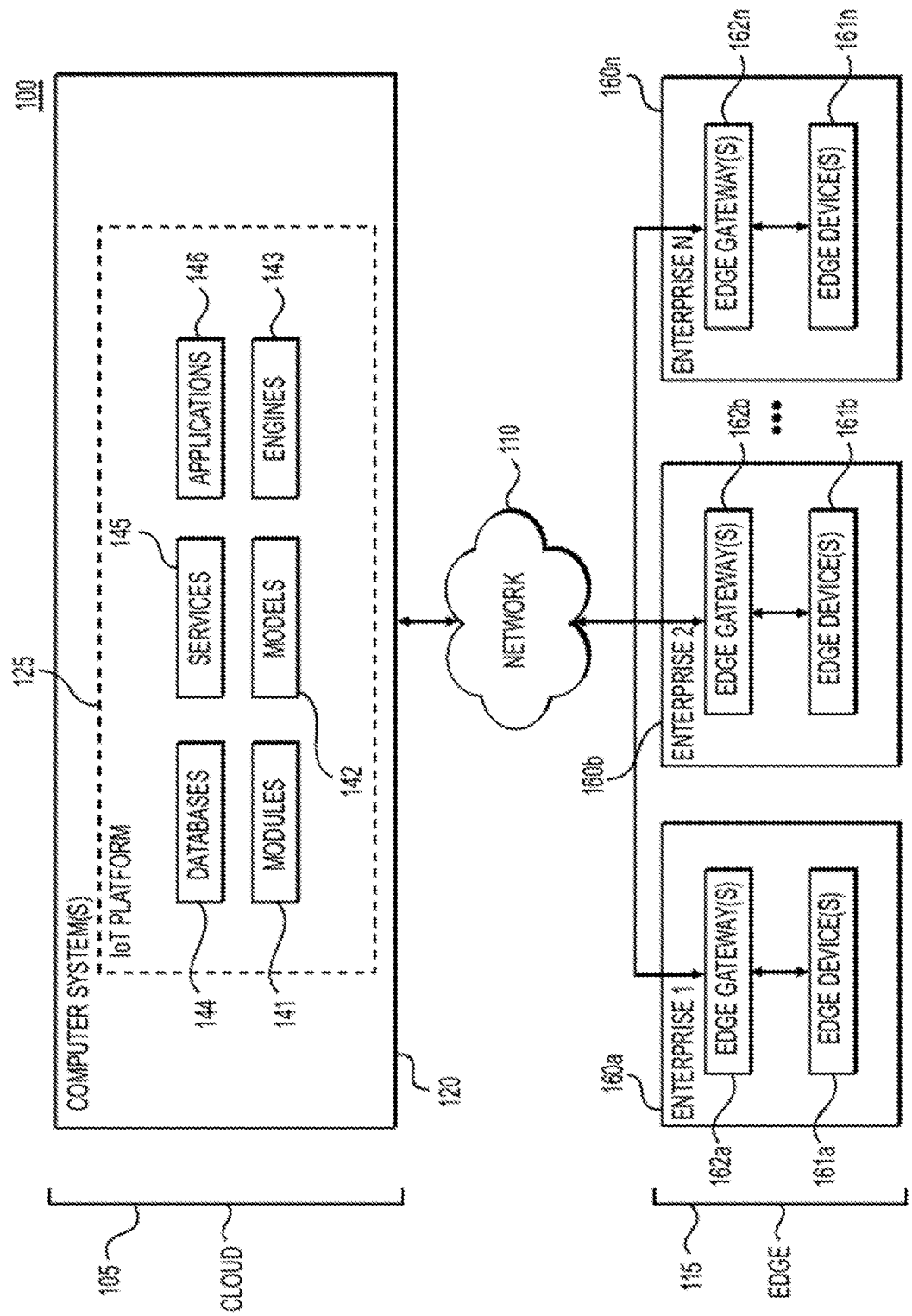
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

An industrial environment generally includes physical assets such machines, sensors, equipment, computing devices, and/or other types of industrial assets configured to execute one or more industrial processes. These industrial assets typically generate, calculate, collect, and/or otherwise obtain various types of data related to the one or more industrial processes and output the data in a raw streaming format to one or more computing devices and/or one or more storage devices associated with an industrial enterprise related to the industrial environment. Additionally, a data ingestion pipeline related to online analytical processing (OLAP) can be employed to organize and/or analyze the data related to the one or more industrial processes. However, an indexing system for storage devices utilized by traditional data ingestion pipeline generally do not provide for concurrent updates and/or modifications to data related to industrial processes, which may result in inefficient data processing and/or inefficient and limited data querying. Furthermore, inaccurate and/or inefficient indexing of data may result in an inaccurate understanding with respect a real-time status, health, configuration, output, and/or operation of one or more industrial assets within an industrial environment.

Thus, to address these and other problems, various embodiments of the present disclosure relate to systems, apparatuses, computer-implemented methods, and/or computer program products that provide database management for modifying data related to industrial assets using an intelligent data queue for data ingestion. For example, the intelligent data queue can be provided via a multilayered state machine. In one or more embodiments, the data queue can be a two-layer cache with a first data cache (e.g., a pending data cache) configured for storing pending data modification requests and a second data cache (e.g., a processing data cache) configured for processing data modification requests. In various embodiments, the intelligent data queue can be configured as a data interceptor and/or surge protector for modification operations with respect to data stored in a database. The modification operations can include, for example, copy, insert, update, and/or delete operations with respect to data stored in a database. In various embodiments, a data ingestion pipeline (e.g., a streaming and/or batch data ingestion pipeline) that includes the intelligent data queue can be provided to facilitate data ingestion into the database. In various embodiments, the database can be a time series database configured to store time series data. For example, data related to the one or more industrial processes and/or one or more industrial assets can be transformed into the time series data via one or more data enrichment processes and/or one or more data contextualization processes. Additionally, the data queue can be configured to ensure that data modification requests with respect to the database do not overwhelm resources at the database and/or do not cause failures for the database. To improve performance of the database and/or related industrial processes, the data queue can be configured to intelligently manage data modification requests and/or detect overlapping data modification requests such that submission of certain data modification requests for the database are postponed to a later time (e.g., a more opportune time) for the database to optimize data ingestion for the database.

In various embodiments, an ingestion specification can be generated for a data modification payload associated with an industrial process and/or an industrial asset based on a type of operation associated with the data modification payload. The data modification payload can be a data modification request (e.g., a data modification message) that requests a particular type of modification with respect to data stored in a database. For example, the data modification payload can be parsed to determine whether the data modification payload is associated with a copy operation, an insert operation, an update operation, a delete operation, or another type of operation for data stored in a database. Furthermore, a particular ingestion specification can be generated for the data modification payload based on whether the data modification payload is associated with a copy operation, an insert operation, an update operation, a delete operation, or another type of operation. For example, a delete transform ingestion specification can be generated for the data modification payload in response to a determination that the data modification payload is associated with a delete operation, an update transform ingestion specification can be generated for the data modification payload in response to a determination that the data modification payload is associated with an update operation, etc. Based on the type of operation associated with the data modification payload and/or the particular ingestion specification for the data modification payload, timing and/or configuration of data ingestion of the data modification payload can be managed with respect to the database.

In various embodiments, the intelligent data queue can mitigate cancelled requests for a downstream database system due to overlapping operations by clients. Therefore, in various embodiments, the intelligent data queue can protect underlying databases from surges in request operations. The intelligent data queue can additionally be configured to detect overlapping and/or conflicting operations before submitting a request to a database, thereby protecting the database from unnecessary allocation for conflicting requests while also mitigating subsequent failure and/or loss of requests. In various embodiments, ingestion of data via the intelligent data queue can facilitate generation and/or updating of contextualized asset data for one or more industrial processes and/or one or more industrial assets. Contextualized asset data has wide range of applications and enables various types of specialized data queries that include, but are not limited to, data queries regarding the identifying information of industrial assets and corresponding sensors, the locality of the industrial assets and corresponding sensor points, the control functions of the industrial assets and sensor points, the engineering units associated with one or more industrial assets, the measurement values captured by the industrial assets and sensor points, and/or the like. Additionally, contextualized asset data can be used to iteratively update a respective digital twin system corresponding to a particular industrial environment in order to monitor, diagnose, troubleshoot, update and/or otherwise improve upon a current configuration of the one or more industrial assets represented by the digital twin system. Accordingly, the various embodiments disclosed herein can reduce computational resources, improve the quality of industrial data generated by industrial assets, and/or contextualize the industrial data such that meaningful data queries related to the industrial data can be made, thereby improving the function, production, and efficiency of an industrial environment and/or a digital twin system.

In this regard, various embodiments described herein are directed towards a data contextualization system for raw streaming data captured and/or generated by one or more industrial assets. In various embodiments, contextualized asset data can be stored as time series data for the one or more industrial assets. In various embodiments, the contextualized asset data is stored in an atomicity, consistency, isolation, and durability (ACID) compliant data lake and/or in a time series database where modification of the contextualized asset data is managed via the intelligent data queue. The contextualized asset data can provide detailed information on the industrial assets and corresponding sensors, the locality of the industrial assets and corresponding sensors, the control functions of the industrial assets and sensors, the engineering units associated with one or more industrial assets, the measurement values captured by the industrial assets and sensors, and/or the like. As such, the contextualized asset data can be employed to update, reconfigure, and/or otherwise improve upon an existing digital twin system associated with a particular industrial environment. The contextualized asset data also offers the benefit of allowing one or more end users associated with a corresponding industrial enterprise to make specialized data queries related to the operation, status, and/or configuration of one or more industrial assets in an industrial environment. These specialized queries can be used to generate insight about the industrial assets and therefore be employed to increase the efficiency and/or output of the industrial assets.

In one or more embodiments, a digital twin system associated with a particular industrial environment can be represented as an extensible object model (EOM). In various embodiments, the data contextualization system can automatically detect whether a change event has taken place, for example, by routinely polling the EOM by executing one or more EOM sync jobs on the EOM comprising the hierarchical reference data and/or a respective knowledge graph associated with the industrial assets of a particular industrial environment. In various embodiments, the data contextualization system can be configured to repeatedly poll the EOM on a predefined schedule (e.g., every few seconds, minutes, hours, days, and/or any combination thereof). In various other embodiments, an end user can manually direct the data contextualization system (e.g., by way of a user computing device) to determine whether a change event has taken place. Based on the change event, the data contextualization system is configured to reconfigure asset data objects associated. In this way, the data contextualization system can accurately contextualize the raw streaming data with the most current configuration of asset data objects.

In various embodiments, the data contextualization system can cause the rendering of one or more portions of raw streaming data, one or more asset data objects, and/or one or more portions of contextualized asset data. For example, the data contextualization system can cause the rendering of the raw streaming data, asset data objects, and/or contextualized asset data via an electronic interface component of one or more user computing devices. In various embodiments, the data contextualization system can generate an interactive tabular representation of the one or more asset data objects stored in the data lake. Additionally, the data contextualization system can generate an interactive tabular representation of the one or more portions of contextualized asset data stored in the time series database.

As such, by employing one or more techniques disclosed herein, various technical improvements can be achieved. For example, employing the one or more techniques disclosed herein can improve the quality of the various types of industrial data stored in one or more data stores (e.g., a data lake and/or time series database) associated with a particular industrial environment by utilizing the intelligent data queue disclosed herein. Furthermore, an amount of time for contextualizing raw streaming data generated by one or more industrial assets can be reduced. Moreover, once the raw streaming data has been properly contextualized, specialized data queries can be made on the contextualized asset data. The specialized data queries can additionally or alternatively reduce the usage of various technical resources and offer detailed insight for analyzing the health, function, efficiency, and/or output of the industrial assets in a particular industrial environment.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100. In certain embodiments, the networked computing system environment 100 is an on-premises networked computing system where the edge 115 is configured as a process control network and the cloud 105 is configured as an enterprise network.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the results to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
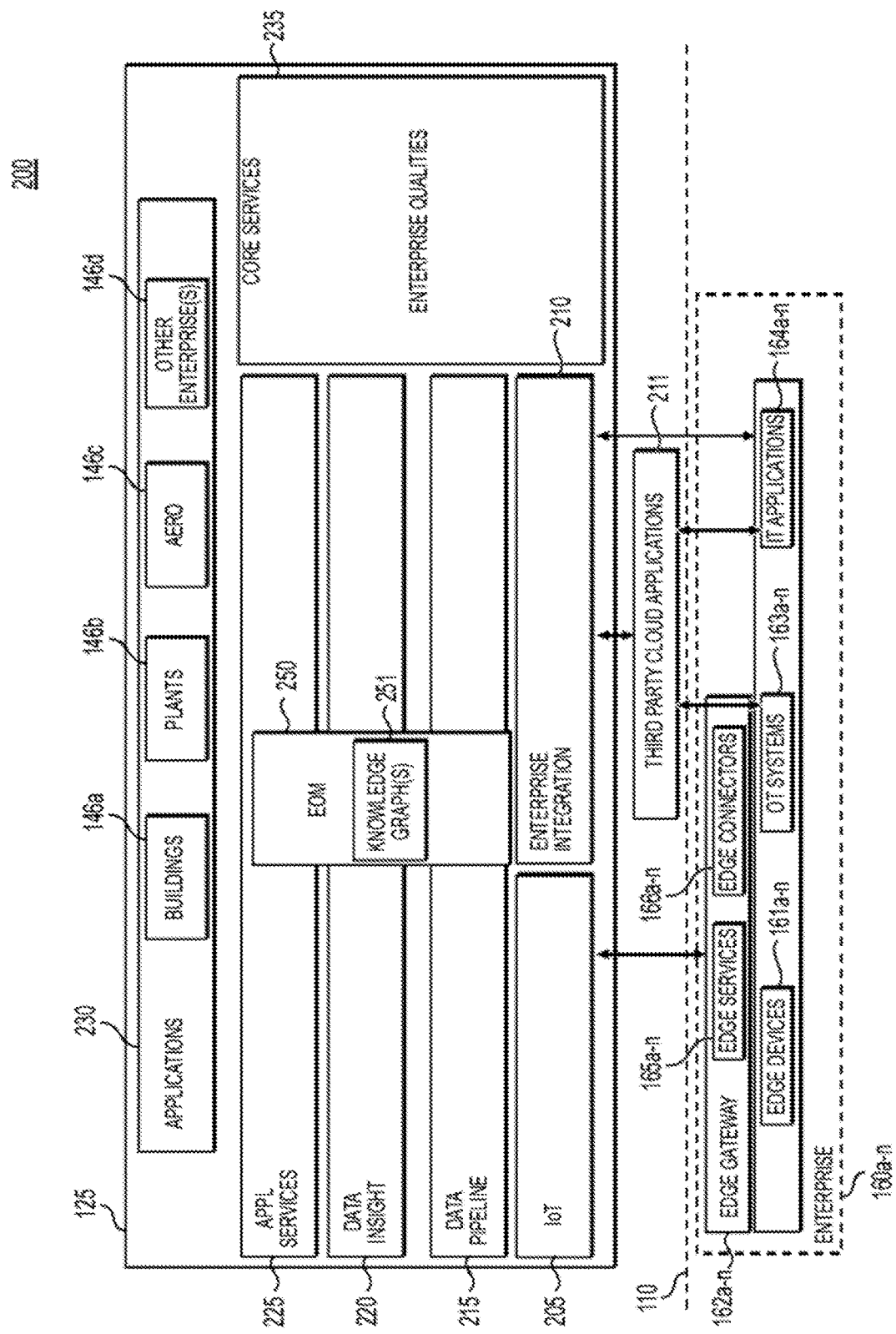
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, air handler units, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 160a-160n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, Wi-Fi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., Wi-Fi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added. In certain embodiments, the framework 200 can be an on-premises framework where the edge devices 161a-161n are configured as part of a process control network and the IoT platform 125 is configured as an enterprise network.

The IoT platform 125 is a model-driven architecture. Thus, the extensible object model 250 communicates with each layer 205-230 to contextualize site data of the enterprise 160a-160n using an extensible graph-based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, an "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 251 receives "TMP" during the modeling phase and determine that "TMP" relates to "temperature." The generated models are then published. The complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any applications operated by an enterprise in relation to its edge devices. For example, the enterprise integration layer 210 connects with enterprise databases, such as guest databases, customer databases, financial databases, patient databases, etc. The enterprise integration layer 210 provides a standard API to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly. In certain embodiments, the enterprise integration layer 210 enables a scalable architecture to expand interfaces to multiple systems and/or system configurations. In certain embodiments, the enterprise integration layer 210 enables integration with an indoor navigation system related to the enterprise 160a-160n.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n). In various embodiments, calculations and/or analytics employed by one or more models such as, for example, the calculation model or another type of model described herein, can be defined in an EOM (e.g., EOM 250).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identify a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TSDB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/ entitlements, logging/monitoring, usage metering, API gateway/dev portal, and the IoT platform 125 streams.

Figure 3:
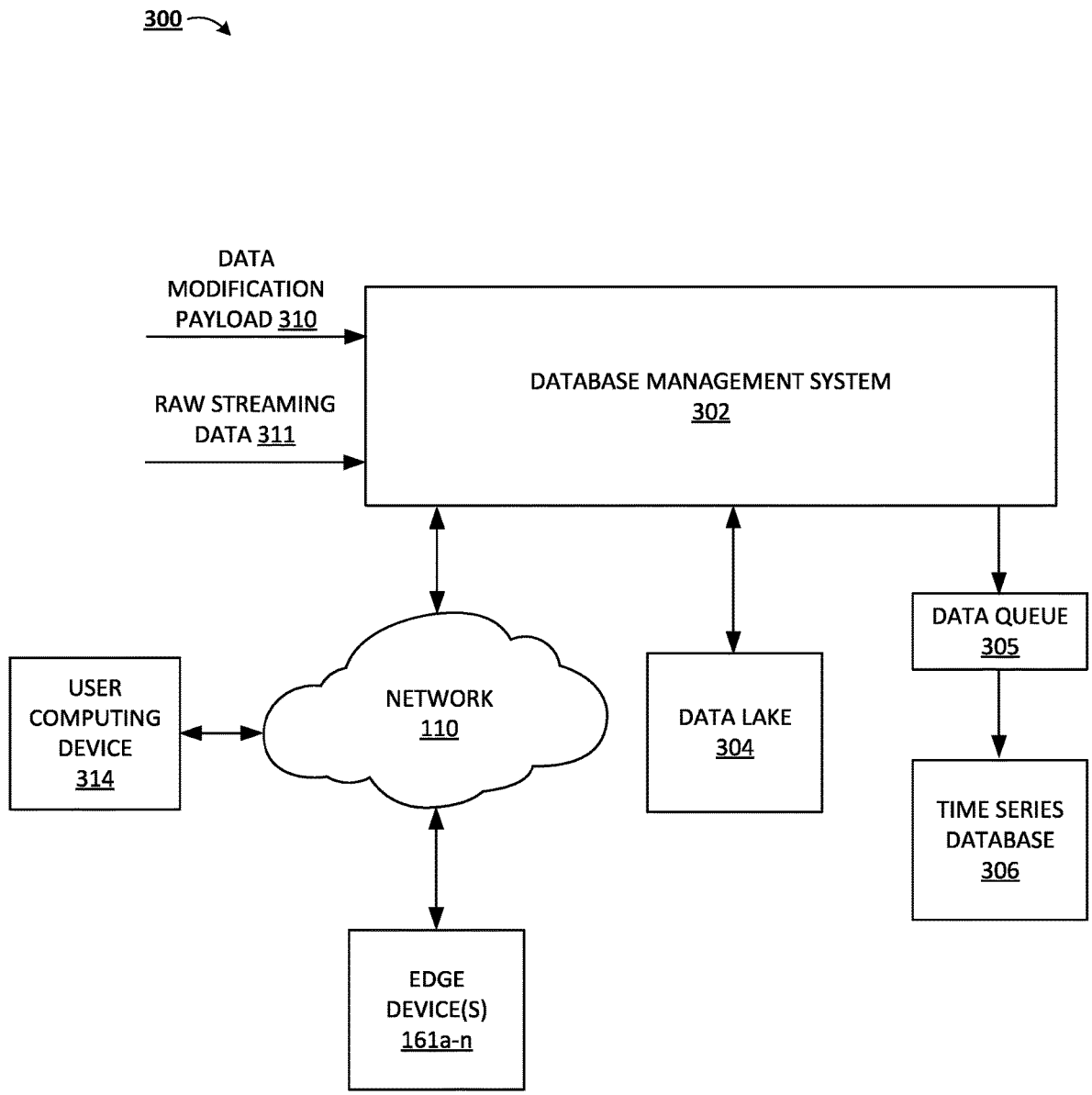
FIG. 3 illustrates a system that provides an exemplary environment related to database management for data associated with industrial assets, in accordance with one or more embodiments described herein.

FIG. 3 illustrates a system 300 that provides an exemplary environment according to one or more described features of one or more embodiments of the disclosure. According to an embodiment, the system 300 includes a database management system 302. The database management system 302 is associated with one or more application products such as data contextualization platform, a data modeling platform, an asset management platform, an asset performance platform, a global operations platform, a site operations platform, an industrial asset platform, an industrial process platform, a digital worker platform, an energy and sustainability platform, a healthy buildings platform, an energy optimization platform, a predictive maintenance platform, a centralized control platform, and/or another type of asset platform. In one or more embodiments, the database management system 302 receives a data modification payload 310 from a user computing device 314. In certain embodiments, the database management system 302 receives the data modification payload 310 via the network 110. Additionally, in one or more embodiments, the database management system 302 transmits contextualized asset data to the user computing device 314. In certain embodiments, the database management system 302 transmits the contextualized asset data via the network 110.

In certain embodiments, the database management system 302 receives raw streaming data 311 generated, captured, and/or otherwise obtained by the edge devices 161a-161n. In one or more embodiments, at least a portion of the raw streaming data 311 from the edge devices 161a-161n is included in the contextualized asset data 312. In one or more embodiments, the edge devices 161a-161n are associated with a portfolio of assets. For instance, in one or more embodiments, the edge devices 161a-161n include one or more assets in a portfolio of assets. The edge devices 161a-161n include, in one or more embodiments, one or more databases, one or more assets (e.g., one or more industrial assets, one or more building assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more air handler units, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and the database management system 302 via the network 110.

The raw streaming data 311 associated with the edge devices 161a-161n includes, for example, industrial asset data related to one or more industrial processes associated with one or more respective industrial assets (e.g., asset configuration data, operational functionality data, asset properties etc.), asset identification data, sensor identification data, sensor data, site data, real-time data, live property value data, event data, process data, operational data, fault data, and/or other data associated with the edge devices 161a-161n). In one or more embodiments, the sensor data includes real-time sensor data, live property value data, historical sensor data, and/or other sensor data for one or more industrial assets (e.g., one or more assets associated with a geographic region for an asset infrastructure). In one or more embodiments, the site data includes specific site data for an asset infrastructure, event data for an asset infrastructure, process data for an asset infrastructure, operational data for an asset infrastructure, fault data for an asset infrastructure, asset infrastructure data for an asset infrastructure, and/or other site data for an asset infrastructure.

Additionally, the raw streaming data 311 includes one or more portions of metadata related to one or more industrial assets. In various embodiments, the one or more portions of metadata can be used to facilitate correlating attributes of the raw streaming data 311 to the contextualized asset data 312 and/or to facilitate formatting one or more portions of the contextualized asset data 312. In one or more embodiments, the one or more portions of metadata include identifying metadata, functional metadata, spatial metadata, asset metadata, algorithm parameters, and/or other metadata. In one or more embodiments, the raw streaming data 311 and/or the contextualized asset data 312 is data that is accessible by a customer identifier based on a set of rules associated with the customer identifier.

In certain embodiments, at least one edge device from the edge devices 161a-161n incorporates encryption capabilities to facilitate encryption of one or more portions of the industrial asset data. Additionally, in one or more embodiments, the database management system 302 receives the raw streaming data 311 associated with the edge devices 161a-161n via the network 110. In one or more embodiments, the network 110 is a Wi-Fi network, an NFC network, a WiMAX network, a PAN, a short-range wireless network (e.g., a Bluetooth® network), an infrared wireless (e.g., IrDA) network, a UWB network, an induction wireless transmission network, and/or another type of network. In one or more embodiments, the edge devices 161a-161n are associated with an industrial environment (e.g., an industrial plant, etc.). Additionally or alternatively, in one or more embodiments, the edge devices 161a-161n are associated with components of the edge 115 such as, for example, one or more enterprises 160a-160n.

The system 300 also comprises one or more dynamic data stores such as a data lake 304 and/or a time series database 306. The data lake 304 and/or the time series database 306 can be configured to store one or more portions of raw streaming data 311, contextualized asset data 312, industrial asset metadata, and/or enterprise-specific configuration data. In one or more embodiments, the database management system 302 aggregates the raw streaming data 311 associated with the edge devices 161a-161n from the edge devices 161a-161n. For instance, in one or more embodiments, the database management system 302 aggregates the data associated with the edge devices 161a-161n into a data lake 304. The data lake 304 is configured to store one or more portions of raw streaming data 311 generated by the one or more respective edge devices 161a-161n as the raw streaming data 311 is received by the database management system 302.

The time series database 306 is a cache memory (e.g., a database structure) that dynamically stores the contextualized asset data 312 associated with one or more respective flattened asset data objects related to one or more respective edge devices 161a-161n based on intervals of time. In one or more embodiments, the database management system 302 can timestamp one or more portions of the raw streaming data 311 as the raw streaming data 311 is received before contextualizing the raw streaming data 311. In various other embodiments, the database management system 302 can parse timestamp information generated by the one or more edge devices 161a-161n from the raw streaming data 311. As such, in one or more embodiments, the time series database 306 can store the contextualized asset data 312 associated with one or more portions of timestamped sensor data captured by one or more sensor points associated with the one or more respective assets, timestamped calculation data computed by one or more processors associated with the one or more respective assets, and/or timestamped measurement data captured by one or more measurement devices associated with the one or more respective assets.

In one or more embodiments, data associated with the time series database 306 is in communication with a cloud application that is accessible by select number of users (e.g., industrial enterprises). For example, in one or more embodiments, the cloud application associated with the time series database 306 is a cloud application accessible by users associated with the edge devices 161a-161n comprised within a particular industrial environment. In one or more embodiments, the cloud application is a computing service provided by any type or combination of application servers, communication servers, web servers, super-computing servers, database servers, file servers, mail servers, proxy servers, and/virtual servers. Additionally, in one or more embodiments, the cloud application manages data associated with the time series database 306.

In one or more embodiments, the database management system 302 repeatedly updates data comprised in the data lake 304 based on the raw streaming data 311 provided by the edge devices 161a-161n. For instance, in one or more embodiments, the database management system 302 stores new data and/or modified data associated with the edge devices 161a-161n (e.g., raw streaming data 311 and/or flattened asset data objects associated with one or more industrial assets). In one or more embodiments, the database management system 302 repeatedly scans the edge devices 161a-161n to determine new data and/or changes to hierarchical reference data associated with the edge devices 161a-161n for storage in the data lake 304.

In one or more embodiments, the database management system 302 formats one or more portions of the raw streaming data 311, contextualized asset data 312, and/or asset metadata. For instance, in one or more embodiments, the database management system 302 provides a formatted version of the data associated with the edge devices 161a-161n to the data lake 304. In an embodiment, the formatted version of the industrial asset data is formatted with one or more defined formats associated with the one or more timestamps and/or the one or more flattened asset data objects. A defined format associated with the flattened asset data objects comprised in the contextualized asset data 312 is, for example, data object configured as a string of text where the various data attributes associated with the corresponding industrial assets are appended to the string of text.

In one or more embodiments, the database management system 302 identifies, groups, and/or otherwise contextualizes data (e.g., raw streaming data 311) associated with the edge devices 161a-161n, thereby generating contextualized asset data 312. In one or more embodiments, the database management system 302 employs batching, concatenation of data associated with the edge devices 161a-161n, identification of data types, merging of data associated with the edge devices 161a-161n, grouping of data associated with the edge devices 161a-161n, reading of data associated with the edge devices 161a-161n, and/or writing of data associated with the edge devices 161a-161n to facilitate storage of data associated with the edge devices 161a-161n within the data lake 304 and/or time series database 306. In one or more embodiments, the database management system 302 groups data associated with the edge devices 161a-161n based on corresponding features and/or attributes of the data. In one or more embodiments, the database management system 302 groups data associated with the edge devices 161a-161n based on corresponding identifiers (e.g., a matching asset hierarchy level, a matching asset, a matching industrial environment, etc.) for the industrial asset data. In one or more embodiments, the database management system 302 employs one or more locality-sensitive hashing techniques to group data associated with the edge devices 161a-161n based on similarity scores and/or calculated distances between different data associated with the edge devices 161a-161n. In one or more embodiments, at least a portion of the data stored in the data lake 304 and the time series database 306 is included in the contextualized asset data 312.

In various embodiments, the database management system 302 can receive the data modification payload 310. In various embodiments, the data modification payload 310 can correspond to, be configured as, or otherwise be associated with an API call request to trigger one or more APIs such as, for example, an API configuration for storing the data modification payload 310 in a data queue 305 for the time series database 306. In one or more embodiments, the data modification payload 310 can be associated with a request to modify one or more portions of data stored in the time series database 306. For example, the data modification payload 310 can be associated with a request to modify one or more portions of asset data and/or contextualized asset data configured as time series data in the time series database 306. The data (e.g., the asset data and/or the contextualized asset data) can digitally represent one or more assets (e.g., one or more of the edge devices 161a-161n) within an industrial environment.

The data queue 305 can be a two-layer cache configured with a first data cache and a second data cache. The first data cache for the data queue 305 can be configured for storing pending data modification requests. The second data cache for the data queue 305 can be configured for processing data modification requests with respect to the time series database 306.

In one or more embodiments, the user computing device 314 is in communication with the database management system 302 via the network 110. In one or more embodiments, the user computing device 314 is integrated within or corresponds to a mobile computing device, a smartphone, a tablet computer, a mobile computer, a desktop computer, a laptop computer, a workstation computer, a wearable device, a virtual reality device, an augmented reality device, or another type of computing device located remote from the database management system 302. In an embodiment, the user computing device 314 transmits the data modification payload 310 to the database management system 302 via the network 110. In another embodiment, the database management system 302 transmits the contextualized asset data to the user computing device 314 via the network 110.

In one or more embodiments, the contextualized asset data includes one or more visual elements for the visual display of the user computing device 314 that renders an interactive user interface based on a respective user interface configuration. For example, the database management system 302 can cause a rendering of visualization data associated with the contextualized asset data and/or the raw streaming data 311. In certain embodiments, the visual display of the user computing device 314 displays one or more graphical elements associated with the contextualized asset data. In certain embodiments, the electronic interface component of the user computing device 314 renders one or more interactive display elements associated with the contextualized asset data. In certain embodiments, the database management system 302 can configure the electronic interface to render an interactive tabular representation of the contextualized asset data and/or the one or more flattened asset data objects associated with hierarchical reference data comprised in the EOM.

Figure 4:
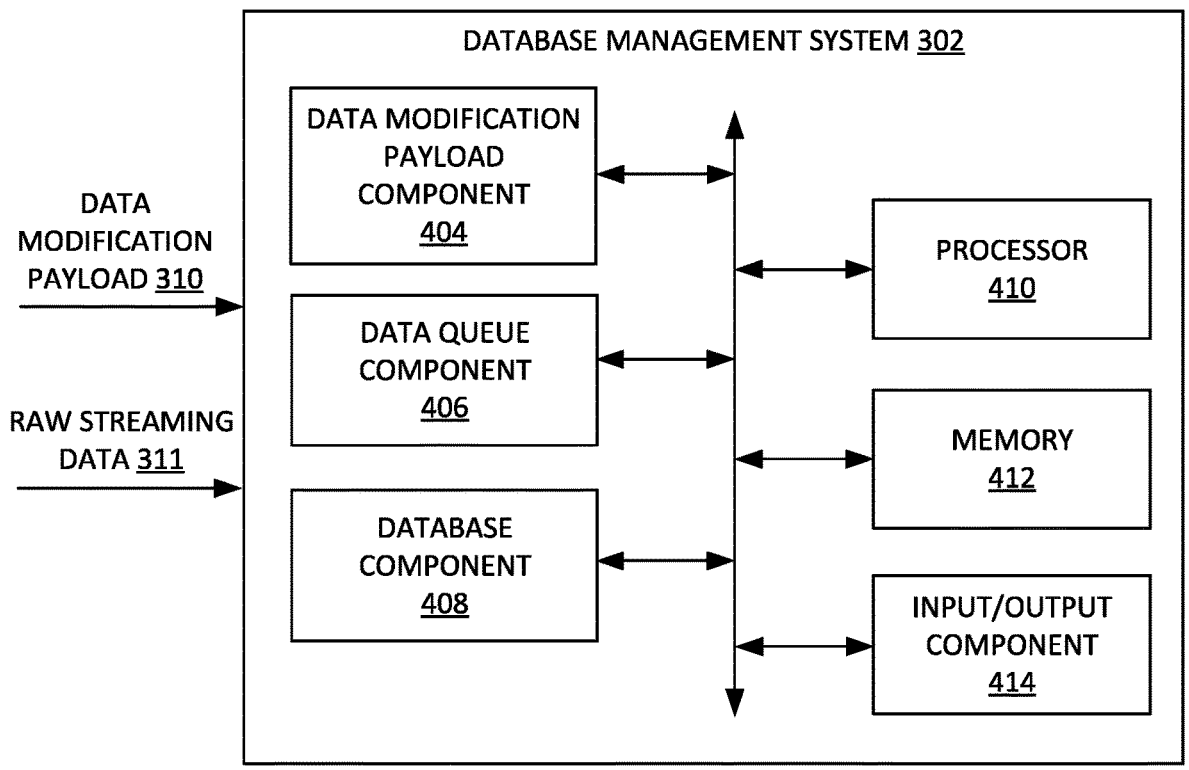
FIG. 4 illustrates an exemplary database management system, in accordance with one or more embodiments described herein.

FIG. 4 illustrates a system 400 that provides an exemplary environment according to one or more described features of one or more embodiments of the disclosure. Specifically, the system 400 details the exemplary database management system 302 (illustrated in FIG. 3) to provide a practical application of managing a database (e.g., the time series database 306) to modify data related to one or more industrial assets (e.g., one or more edge devices 161a-161n) in an industrial environment using an intelligent data queue (e.g., the data queue 305) for ingestion of the modified data into the database. In various embodiments, the database management system 302 provides a practical application of data analytics technology and/or digital transformation technology to facilitate contextualization of raw streaming data with one or more data attributes. In one or more embodiments, the database management system 302 provides a practical application of receiving requests (e.g., data modification payload 310) to generate and/or modify contextualized asset data.

In an embodiment, the database management system 302 works in conjunction with a server system (e.g., a server device such as data lake 304), one or more data sources, and/or one or more assets associated with an industrial environment (e.g., edge devices 161a-161n). In one or more embodiments, the database management system 302 comprises one or more processors and a memory. In one or more embodiments, the database management system 302 interacts with a computer system from the computer systems 120 to facilitate database management in accordance with the present disclosure. In one or more embodiments, the database management system 302 interacts with a computer system from the computer systems 120 via the network 110.

The database management system 302 is also related to one or more technologies, such as, for example, enterprise technologies, industrial technologies, connected building technologies, IoT technologies, user interface technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

Moreover, the database management system 302 provides an improvement to one or more technologies such as enterprise technologies, industrial technologies, connected building technologies, IoT technologies, user interface technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the database management system 302 improves performance of the time series database 306 and/or quality of data stored in the time series database 306 to facilitate improved performance of one or more industrial assets and/or one or more industrial processes.

Additionally or alternatively, the database management system 302 improves performance of a user computing device 314. For example, in one or more embodiments, the database management system 302 improves processing efficiency of a user computing device 314, reduces power consumption of a user computing device 314, improves quality of data provided by a user computing device 314, etc. In various embodiments, the database management system 302 improves performance of a user computing device 314 by optimizing content rendered via an interactive user interface, by reducing a number of user interactions with respect to an interactive user interface, and/or by reducing a number of computing resources required to render content via an interactive user interface.

The database management system 302 includes a data modification payload component 404, a data queue component 406, and/or a database component 408. Additionally, in one or more embodiments, the database management system 302 includes a processor 410, a memory 412, and/or an input/output component 414. In certain embodiments, one or more aspects of the database management system 302 (and/or other systems, apparatuses and/or processes disclosed herein) constitute executable instructions embodied within a computer-readable storage medium (e.g., the memory 412). For instance, in an embodiment, the memory 412 stores computer executable component and/or executable instructions (e.g., program instructions). Furthermore, the processor 410 facilitates execution of the computer executable components and/or the executable instructions (e.g., the program instructions). In an example embodiment, the processor 410 is configured to execute instructions stored in the memory 412 or otherwise accessible to the processor 410.

The processor 410 is a hardware entity (e.g., physically embodied in circuitry) capable of performing operations according to one or more embodiments of the disclosure. Alternatively, in an embodiment where the processor 410 is embodied as an executor of software instructions, the software instructions configure the processor 410 to perform one or more algorithms and/or operations described herein in response to the software instructions being executed. In an embodiment, the processor 410 is a single core processor, a multi-core processor, multiple processors internal to the database management system 302, a remote processor (e.g., a processor implemented on a server), and/or a virtual machine. In certain embodiments, the processor 410 is in communication with the memory 412, the data modification payload component 404, the data queue component 406, and/or the database component 408 via a bus to, for example, facilitate transmission of data among the processor 410, the memory 412, the input/output component 414, the data modification payload component 404, the data queue component 406, and/or the database component 408. The processor 410 may be embodied in a number of different ways and, in certain embodiments, includes one or more processing devices configured to perform independently. Additionally or alternatively, in one or more embodiments, the processor 410 includes one or more processors configured in tandem via a bus to enable independent execution of instructions, pipelining of data, and/or multi-thread execution of instructions.

The memory 412 is non-transitory and includes, for example, one or more volatile memories and/or one or more non-volatile memories. In other words, in one or more embodiments, the memory 412 is an electronic storage device (e.g., a computer-readable storage medium). The memory 412 is configured to store information, data, content, one or more applications, one or more instructions, or the like, to enable database management system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In various embodiments, the data modification payload component 404, the data queue component 406, and the database component 408 embody executable computer program code and/or interface with one or more computer programs and/or computer hardware configured to employ data modeling and contextualization conventions to support raw streaming data contextualization for one or more industrial assets related to one or more industrial processes in an industrial environment. In various embodiments, the one or more industrial processes are related to the edge devices 161a-161n. In one or more embodiments, the edge devices 161a-161n are associated with the portfolio of assets. For instance, in one or more embodiments, the edge devices 161a-161n include one or more assets in a portfolio of assets. The edge devices 161a-161n include, in one or more embodiments, one or more databases, one or more assets (e.g., one or more building assets, one or more industrial assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more air handler units, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and a database management system 302 via the network 110. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

In one or more embodiments, the input/output component 414 is configured to receive the data modification payload 310 and/or the raw streaming data 311. In various embodiments, the input/output component 414 can transmit (e.g., relay, etc.) the data modification payload 310 and/or the raw streaming data 311 to the data modification payload component 404, the data queue component 406, and/or the database component 408 for processing and/or compiling of data related to the data modification payload 310 and/or the raw streaming data 311. Once the data has been compiled (e.g., as by the data modification payload component 404, the data queue component 406, and/or the database component 408), the input/output component 414 can transmit the data (e.g., modified data) to the time series database 306 and/or the one or more user computing devices 314.

The data modification payload component 404 can parse the data modification payload 310 to identify a type of modification with respect to the data stored in the time series database 306. The type of modification can include a copy operation, an insert operation, an update operation, a delete operation, or another type of operation to modify data stored in the time series database 306. In certain embodiments, the data modification payload 310 received by the database management system 302 (e.g., by way of the input/output component 414) can additionally include one or more data attributes that describe a particular physical industrial asset (e.g., a particular edge device 161a-161n). For instance, in one or more embodiments, the data modification payload 310 can include one or more data attributes that describe the edge devices 161a-161n in order to modify data associated with the respective edge devices 161a-161n. A data attribute includes, for example, time data (e.g., a segment start time and/or end time related a data modification), a data source identifier for a data modification, data properties such as an asset identifier, an asset role, an asset manufacturer identifier, a corresponding engineering unit identifier, an asset location, an asset sensor identifier, a virtual asset identifier, an asset sensor type, an asset sensor measurement value, a user identifier, a change event identifier, and/or one or more other data attributes.

The data queue component 406 can store the data modification payload 310 in the data queue 305 based at least in part on the type of modification and/or the one or more data attributes associated with the data modification payload 310. In various embodiments, the data queue 305 can be configured as a dual cache. For example, the data queue component 406 can store the data modification payload 310 in the at least one of the first data cache of the data queue 305 configured for storing pending data modification payloads and/or the second data cache of the data queue 305 configured for processing data modification payloads based at least in part on the type of modification and/or the one or more data attributes associated with the data modification payload 310. In one or more embodiments, the data queue component 406 can initially store the data modification payload 310 in the first data cache of the data queue 305 based on a data source identifier for the time series database 306, a segment start time for modifying data in the time series database 306, a segment end time for modifying data in the time series database 306, and/or a type of modification to be performed with respect to data in the time series database 306. Additionally, in response to a determination that the type of modification and/or the one or more data attributes associated with the data modification payload 310 satisfy a set of cache operation rules for the second data cache of the data queue 305, the data queue component 406 can move the data modification payload 310 into the second data cache of the data queue 305. The set of cache operation rules can be related to one or more reasons for proceeding with processing of the data modification payload 310. For example, a cache operation rule from the set of cache operations rules can be related to an amount of memory space in the second data cache, whether a tracking identifier for the data modification payload 310 exists in the second data cache, whether a segment time for the data modification payload 310 conflicts with another data modification payload in the second data cache, etc.

In response to a determination that the data modification payload 310 is stored in the second data cache of the data queue 305, the database component 408 can be configured to ingest the data modification payload 310 into the time series database 306. The database component 408 can be configured to ingest the data modification payload 310 into the time series database 306 based on the type of modification and/or the one or more data attributes associated with the data modification payload 310. For example, the database component 408 can be configured to ingest the data modification payload 310 into the time series database 306 based on a data source identifier for the time series database 306, a segment start time for modifying data in the time series database 306, a segment end time for modifying data in the time series database 306, and/or a type of modification to be performed with respect to data in the time series database 306. In an example, the database component 408 can be configured to update a portion of data in the time series database 306 with a data payload included in the data modification payload 310 in response to a determination that the type of modification for the data modification payload 310 corresponds to an update modification operation. Additionally, the database component 408 can be configured to update the portion of the data in the time series database 306 based on the one or more data attributes associated with the data modification payload 310. For example, the database component 408 can be configured to update a portion of the data for an interval of time in the time series database 306 that corresponds to the segment start time and the segment end time included in the data modification payload 310.

Figure 5:
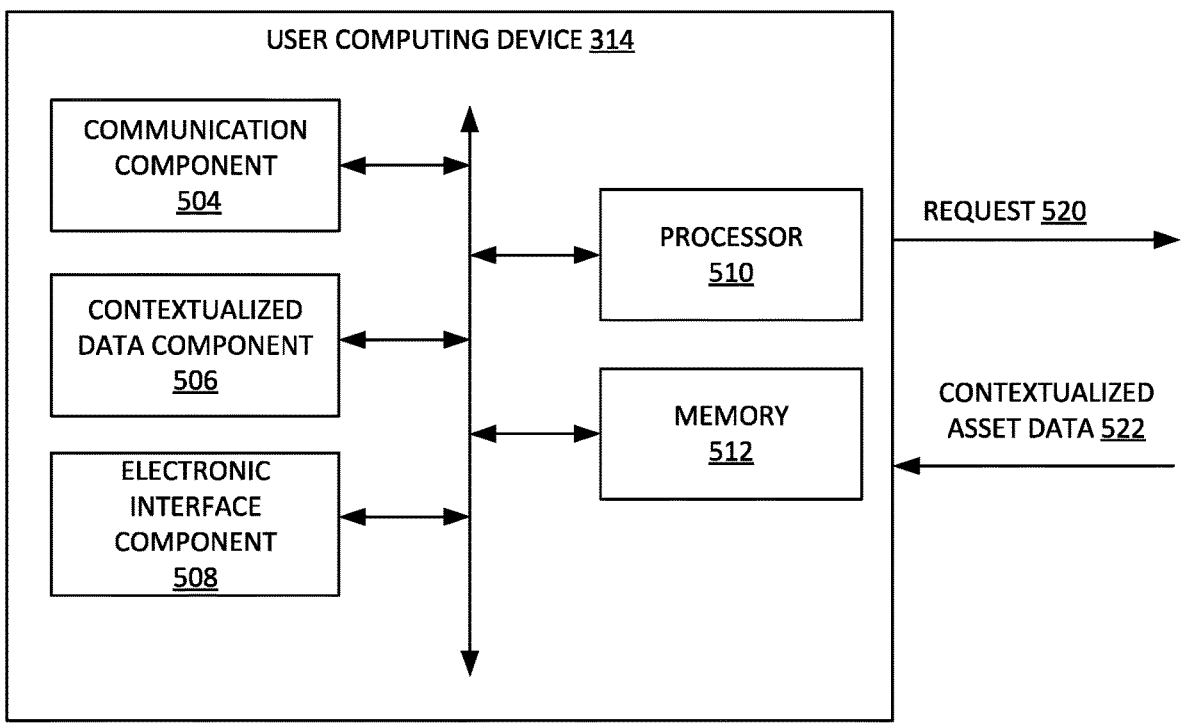
FIG. 5 illustrates an exemplary user computing device, in accordance with one or more embodiments described herein.

FIG. 5 illustrates a system 500 that provides an exemplary environment according to one or more described features of one or more embodiments of the disclosure. According to an embodiment, the system 500 includes the user computing device 314 to provide a practical application of data modeling and inheritance conventions to support streaming data contextualization for one or more industrial assets in an industrial environment. In various embodiments, the user computing device 314 provides a practical application of data analytics technology and/or digital transformation technology to facilitate streaming data contextualization for one or more industrial assets. In one or more embodiments, the user computing device 314 provides a practical application of sending requests to poll the EOM 250 by executing one or more EOM sync jobs, a request to update one or more portions of hierarchical reference data (e.g., data comprised in a knowledge graphs 251), a request to generate one or more flattened asset data objects associated with the one or more respective portions of hierarchical reference data associated with edge devices 161*a*-161*n*, a request to determine one or more change events associated with the hierarchical reference data associated with a particular industrial environment, and/or a request to generate one or more portions of contextualized asset data 312.

In an embodiment, the user computing device 314 facilitates interaction with a database management system 302 associated with a server system (e.g., a server device such as data lake 304), one or more data sources, and/or one or more industrial assets associated with an industrial environment (e.g., edge devices 161*a*-161*n*). In one or more embodiments, the user computing device 314 is a device with one or more processors and a memory. In one or more embodiments, the user computing device 314 interacts with a computer system from the computer systems 120 to facilitate providing an interactive user interface associated with data modeling and asset entity inheritance conventions. In various embodiments, the interactive user interface is configured via the electronic interface component 508 as a dashboard visualization associated with contextualizing raw streaming data 311 associated with one or more edge devices 161*a*-161*n*. In one or more embodiments, the user computing device 314 interacts with a computer system from the computer systems 120 via the network 110.

Moreover, the user computing device 314 provides an improvement to one or more technologies such as enterprise technologies, industrial technologies, connected building technologies, IoT technologies, user interface technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the user computing device 314 improves performance of a user computing device. For example, in one or more embodiments, the user computing device 314 improves processing efficiency of a user computing device, reduces power consumption of a computing device, improves quality of data provided by a user computing device, etc. In various embodiments, the user computing device 314 improves performance of a user computing device by optimizing content rendered via an interactive user interface, by reducing a number of user interactions with respect to an interactive user interface, and/or by reducing a number of computing resources required to render content via an interactive user interface.

The user computing device 314 includes a communication component 504, a contextualized data component 506, and/or an electronic interface component 508. Additionally, in one or more embodiments, the user computing device 314 includes a processor 510 and/or a memory 512. In certain embodiments, one or more aspects of the user computing device 314 (and/or other systems, apparatuses and/or processes disclosed herein) constitute executable instructions embodied within a computer-readable storage medium (e.g., the memory 512). For instance, in an embodiment, the memory 512 stores computer executable component and/or executable instructions (e.g., program instructions). Furthermore, the processor 510 facilitates execution of the computer executable components and/or the executable instructions (e.g., the program instructions). In an example embodiment, the processor 510 is configured to execute instructions stored in the memory 512 or otherwise accessible to the processor 510.

The processor 510 is a hardware entity (e.g., physically embodied in circuitry) capable of performing operations according to one or more embodiments of the disclosure. Alternatively, in an embodiment where the processor 510 is embodied as an executor of software instructions, the software instructions configure the processor 510 to perform one or more algorithms and/or operations described herein in response to the software instructions being executed. In an embodiment, the processor 510 is a single core processor, a multi-core processor, multiple processors internal to the user computing device 314, a remote processor (e.g., a processor implemented on a server), and/or a virtual machine. In certain embodiments, the processor 510 is in communication with the memory 512, the communication component 504, the contextualized data component 506 and/or the electronic interface component 508 via a bus to, for example, facilitate transmission of data among the processor 510, the memory 512, the communication component 504, the contextualized data component 506, and/or electronic interface component 508. The processor 510 may be embodied in a number of different ways and, in certain embodiments, includes one or more processing devices configured to perform independently. Additionally or alternatively, in one or more embodiments, the processor 510 includes one or more processors configured in tandem via a bus to enable independent execution of instructions, pipelining of data, and/or multi-thread execution of instructions.

The memory 512 is non-transitory and includes, for example, one or more volatile memories and/or one or more non-volatile memories. In other words, in one or more embodiments, the memory 512 is an electronic storage device (e.g., a computer-readable storage medium). The memory 512 is configured to store information, data, content, one or more applications, one or more instructions, or the like, to enable the user computing device 314 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In one or more embodiments, the communication component 504 is configured to generate a request 520. In one or more embodiments, the request 520 corresponds to the data modification payload 310. In one or more other embodiments, the request 520 is a request to poll an EOM (e.g., EOM 250), a request to update one or more portions of hierarchical reference data (e.g., data comprised in a knowledge graphs 251), a request to generate one or more asset data objects associated with the one or more respective portions of data associated with edge devices 161a-161n, a request to determine one or more change events associated with data associated with a particular industrial environment, and/or a request to generate one or more portions of contextualized asset data 522 stored in the time series database 306. In various embodiments, the communication component 504 generates the request 520 in response to an action performed with respect to a user interface configuration for an interactive user interface rendered on a visual display via the electronic interface component 508. The action can be, for example, initiating execution of an application (e.g., a mobile application) via a user computing device that presents the interactive user interface, altering an interactive graphical element via the interactive user interface, or another type of action with respect to the interactive user interface rendered via the electronic interface component 508. Additionally or alternatively, in one or more embodiments, the communication component 504 generates the request 520 in response to execution of a user authentication process via a user computing device. For example, in an embodiment, the user authentication process is associated with password entry, facial recognition, biometric recognition, security key exchange, and/or another security technique associated with a user computing device.

In various embodiments, the interactive user interface is a dashboard visualization related to data modeling and streaming data contextualization conventions to support streaming data contextualization for one or more industrial assets related to one or more industrial processes in an industrial environment. In various embodiments, the one or more industrial processes are related to the edge devices 161a-161n (e.g., the edge devices 161a-161n included in a portfolio of assets). In one or more embodiments, the edge devices 161a-161n are associated with the portfolio of assets. For instance, in one or more embodiments, the edge devices 161a-161n include one or more assets in a portfolio of assets. The edge devices 161a-161n include, in one or more embodiments, one or more databases, one or more assets (e.g., one or more building assets, one or more industrial assets, etc.), one or more IoT devices (e.g., one or more industrial IoT devices), one or more connected building assets, one or more sensor points, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more air handler units, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and a data contextualization system via the network 110. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

In one or more embodiments, the request 520 includes one or more asset descriptors that describe a particular type of one or more physical industrial assets. For instance, in one or more embodiments, the request 520 includes one or more asset descriptors that describe the edge devices 161a-161n in order to generate a digital asset template associated with a particular type of asset comprised in the edge devices 161a-161n. An asset descriptor includes, for example, asset properties such as an asset name, an asset inheritance identifier, an asset level and/or operational functionalities such as the industrial process associated with the asset as well as one or more measurement points the asset is capable of capturing values for.

In an embodiment, the communication component 504 is configured to transmit the request 520. In one or more embodiments, the communication component 504 transmits the request 520 to a server system. For example, in one or more embodiments, the communication component 504 transmits the request 520 to a data contextualization system (e.g., database management system 302). In one or more embodiments, the communication component 504 transmits the request 520 to a computer system from the computer systems 120 to facilitate altering configuration of the interactive user interface. In one or more embodiments, the communication component 504 transmits the request 520 via the network 110.

In one or more embodiments, in response to the request 520, the communication component 504 and/or the contextualized data component 506 is configured to receive contextualized asset data 522. In one or more embodiments, the contextualized data component 506 receives the contextualized asset data 522 from the server system. For example, in one or more embodiments, the contextualized data component 506 receives the contextualized asset data 522 from the time series database 306 managed by the database management system 302. In one or more embodiments, the contextualized data component 506 receives the contextualized asset data 522 from a computer system from the computer systems 120 to facilitate altering configuration of the interactive user interface based on the contextualized asset data 522. In one or more embodiments, the communication component 504 and/or the contextualized data component 506 receives the contextualized asset data 522 via the network 110. In certain embodiments, the communication component 504 and/or the contextualized data component 506 incorporates encryption capabilities to facilitate encryption and/or decryption of one or more portions of the contextualized asset data 522.

In one or more embodiments, the electronic interface component 508 is configured to render an interactive tabular representation of the contextualized asset data 522 via an interactive user interface (e.g., on the electronic interface component 508). In one or more embodiments, the interactive user interface is configured as a dashboard visualization rendered via a display of a user computing device. In other various embodiments, the interactive user interface is configured as a command-line interface. In one or more embodiments, the electronic interface component 508 renders the interactive tabular representation of the contextualized asset data 522 as respective interactive display elements on the interactive user interface. An interactive display element is a portion of the interactive user interface (e.g., a user-interactive electronic interface portion) that provides interaction with respect to a user of the user computing device. For example, in one or more embodiments, an interactive display element is an interactive display element associated with a set of pixels that allows a user to provide feedback and/or to perform one or more actions with respect to the interactive user interface. In an embodiment, in response to interaction with an interactive display element, the interactive user interface is dynamically altered to display one or more altered portions of the interactive user interface associated with different visual data and/or different interactive display elements.

Additionally, in one or more embodiments, the electronic interface component 508 is configured to facilitate execution and/or initiation of one or more actions via the interactive tabular representation of the contextualized asset data 522. In an embodiment, an action is executed and/or initiated via an interactive display element of the dashboard visualization. For instance, an interaction with the interactive tabular representation of the contextualized asset data 522 can cause execution of an update, modification, deletion, and/or other processing related to the hierarchical reference data, asset metadata, raw streaming data, and/or any other data associated with the edge devices 161a-161n. In certain embodiments, the interactive user interface presents one or more notifications associated with the prioritized actions related to the contextualized asset data 522. In certain embodiments, an action related to an interactive display element of the interactive user interface includes an action associated with the application services layer 225, the applications layer 230, and/or the core services layer 235.

Figure 6:
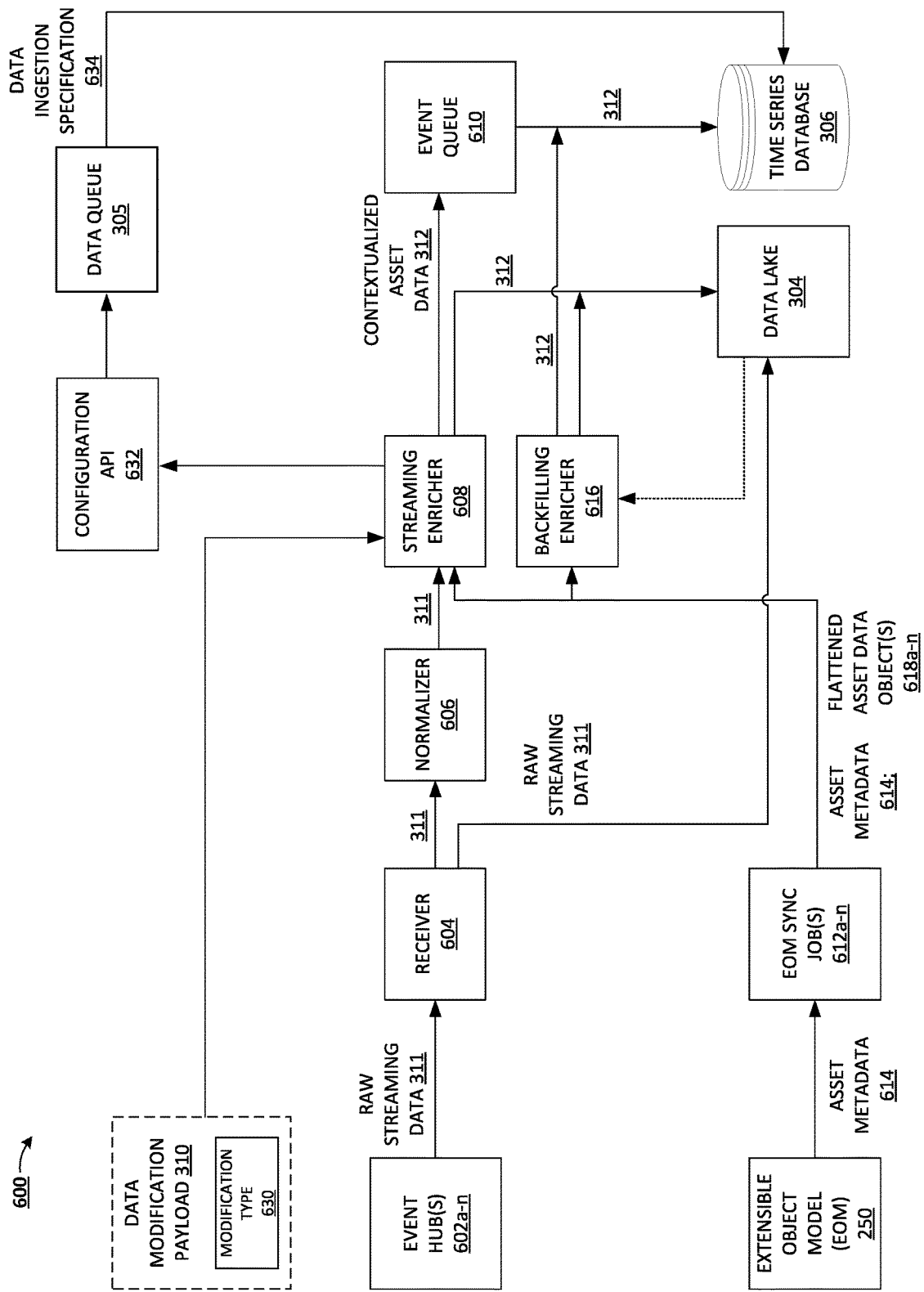
FIG. 6 illustrates an exemplary system for modifying data related to industrial assets using an intelligent data queue for data ingestion, in accordance with one or more embodiments described herein.

FIG. 6 illustrates a system 600 for modifying data related to industrial assets using an intelligent data queue for data ingestion, in accordance with one or more embodiments described herein. In various embodiments, the system 600 additionally or alternatively provides for contextualizing raw streaming data (e.g., raw streaming data 311) for industrial assets (e.g., edge devices 161a-161n). In an embodiment, the system 600 includes one or more components of the database management system 302 for example, the data modification payload component 404 comprising a receiver 604, a normalizer 606, a streaming enricher 608, and/or a backfilling enricher 616. The system 600 also comprises one or more data stores (e.g., the data lake 304 and the time series database 306), as well as one or more event hubs 602a-602n, an event queue 610, one or more EOM sync jobs 612n-612n, and/or the EOM 250.

In various embodiments, the one or more event hubs 602a-602n can be configured to listen for new raw streaming data 311 being generated by the edge devices 161-161n. In various embodiments, the one or more event hubs 602a-602n can be integrated with the edge gateways 162a-162n. In various other embodiments, the event hubs 602a-602n can be embodied by, or integrated with, the edge services 165a-165n. Additionally or alternatively, the one or more event hubs 602a-602n can be cloud-based data listeners configured to ingest raw streaming data 311 via the network 110. In one or more embodiments, the event hubs 602a-602n can be configured to ingest data in real-time (e.g., raw streaming data 311) from one or more data sources simultaneously in parallel, and/or sequentially.

The receiver 604 is configured to intake all raw streaming data 311 generated by the edge devices 161a-161n that has been initially ingested by the one or more event hubs 602a-602n. Additionally, the receiver 604 is also configured to transmit the raw streaming data 311 to the data lake 304. The normalizer 606 comprised within the data modification payload component 404 can be configured to assess the quality of the of the raw streaming data 311. For example, the normalizer 606 can determine whether one or more portions of metadata associated with the edge devices 161a-161n are missing and/or corrupt. The normalizer 606 is also configured to transmit the raw streaming data 311 to the streaming enricher 608.

The streaming enricher 608 is configured to receive one or more portions of asset metadata 614 derived from the EOM 250. Additionally, the streaming enricher 608 is configured to receive one or more flattened asset data objects 618a-618n. In one or more embodiments, the one or more portions of asset metadata 614 are determined during one or more preprocessing steps associated with the EOM 250. For example, the knowledge graphs 251 comprised in the EOM 250 can be traversed to determine the asset metadata 614. In various embodiments, the database management system 302 initializes the EOM sync jobs 612a-6122N which fetch, parse, and map the hierarchical reference data comprising the asset metadata 614 to generate the one or more flattened asset data objects 618a-618n. As such, the one or more flattened asset data objects 618a-618n can comprise respective mappings of one or more data attributes for the hierarchical reference data associated with one or more respective industrial asset(s) (e.g., edge devices 161a-161n) within the industrial environment. In one or more embodiments, the EOM sync jobs 612a-6122N are initialized as the result of one or more knowledge graph API calls executed by the database management system 302. The flattened asset data objects 618a-618n are then persisted in the data lake 304. Once the flattened asset data objects 618a-618n are persisted, the EOM sync jobs 612a-6122N are terminated (as the EOM sync jobs 612a-6122N run in a batch processing mode). The one or more flattened asset data objects 618a-618n comprise one or more data attributes associated with a respective industrial asset (e.g., edge devices 161a-161n) within the industrial environment, and the one or more data attributes can comprise at least one of an asset identifier, an asset role, an asset manufacturer identifier, a corresponding engineering unit identifier, an asset location, an asset sensor point identifier, an asset sensor type, an asset sensor measurement value, a user identifier, a change event identifier, or a timestamp. Additionally, the one or more data attributes can be associated with one or more respective primitive data types.

In various embodiments, the hierarchical reference data is comprised in a knowledge graph 251 associated with the one or more industrial assets within the industrial environment. In order to generate the flattened asset data objects 618a-618n, the database management system 302 is configured to initialize one or more EOM sync jobs 612a-612n to traverse the knowledge graph 251 to parse the hierarchical reference data associated with the one or more respective industrial assets. In various embodiments, traversing the knowledge graph 251 comprises making one or more knowledge graph API calls in a sequentially reactive manner. Various embodiments employ a reactive pagination technique when reading industrial asset and sensor model information from the knowledge graph 251. As there can be hundreds of megabytes worth of data, it is common that an API may time out before all the relevant data is read. To avoid these scenarios, the knowledge graph APIs are configured to read knowledge graph data in a reactive, sequential manner such that all the knowledge graph data is completely read before moving to the subsequent steps of the methods described herein.

In one or more embodiments, the streaming enricher 608 contextualizes one or more portions of the raw streaming data 311 based on one or more corresponding flattened asset data objects 618a-618n associated with the edge devices 161a-161n. For instance, the database management system 302 is configured to generate, based at least in part on the results of the one or more EOM sync jobs 612a-612n, one or more flattened asset data objects 618a-618n corresponding to the edge devices 161a-161n. As such, the streaming enricher 608 can be configured to contextualize the raw streaming data 311 with the one or more flattened asset data objects 618a-618n in order to generate contextualized asset data 312. In various embodiments, contextualizing the raw streaming data 311 with the one or more flattened asset data objects 618a-618n comprises joining, concatenating, formatting, generating respective data objects, and/or otherwise associating the raw streaming data 311 with the one or more flattened asset data objects 618a-618n in order to create contextualized asset data 312.

In one or more embodiments, the streaming enricher 608 contextualizes data from the raw streaming data 311 based on corresponding attributes and/or corresponding features of asset metadata 614 associated with one or more respective flattened asset data objects 618a-618n to generate contextualized asset data 312. In one or more embodiments, the streaming enricher 608 contextualizes data from the raw streaming data 311 based on one or more corresponding data attributes (e.g., comprised in asset metadata 614) associated with the flattened asset data objects 618a-618n such as one or more asset identifiers, asset roles, asset manufacturer identifiers, corresponding engineering unit identifiers, asset locations, asset sensor point identifiers, asset sensor types, asset sensor measurement values, user identifiers, change event identifiers, and/or timestamps. In one or more embodiments, the streaming enricher 608 formats data associated with the time series database 306 (e.g., contextualized asset data 312) based on the one or more corresponding data attributes (e.g., comprised in asset metadata 614), one or more user identifiers, one or more change event identifiers, and/or one or more timestamps. The streaming enricher 608 is also configured to transmit the contextualized asset data 312, in conjunction with the database component 408, to the data lake 304. In various embodiments, the streaming enricher 608 is also configured to transmit the contextualized asset data 312, in conjunction with the database component 408, to the time series database 306 via an event queue 610.

In one or more embodiments, the backfilling enricher 616 re-contextualizes, updates, and/or otherwise reconfigures one or more portions of contextualized asset data 312 that has been previously stored in the data lake 304. In some circumstances, for example, after a change event related to a change and/or reconfiguration of the hierarchical reference data associated with one or more industrial assets has taken place, the defined format of the flattened asset data objects 618a-618n, the contextualized asset data 312, and/or asset metadata 614 may have changed. In such circumstances, the format and/or configuration of the contextualized asset data 312 associated with timestamps prior to the change event may no longer be compatible. As such, the backfilling enricher 616 is configured to integrate with the data lake 304 to ensure that any industrial asset data comprised in the data lake 304 (e.g., contextualized asset data 312) is configured to match and/or be compatible with the current defined data formats, data schema, data attribute configurations, and/or the like associated with a particular industrial environment.

To facilitate modification of data stored in the time series database 306, in one or more embodiments, the data modification payload 310 can be received by the streaming enricher 608. The data modification payload 310 can include at least a modification type 630 that identifies a type of modification to perform with respect to data stored in the time series database 306. For example, the modification type 630 can correspond to a copy operation, an insert operation, an update operation, a delete operation, or another type of operation to be performed with respect to data stored in the time series database 306. In one or more embodiments, the streaming enricher 608 can receive the data modification payload 310. In various embodiments, the streaming enricher 608 can parse a header of the data modification payload 310 to determine the modification type 630. The streaming enricher 608 can also execute a configuration API 632 based on the data modification payload 310 to facilitate storage of the data modification payload 310 into the data queue 305. The configuration API 632 can be configured to manage incoming data modification requests for the time series database 306. Initially, the data modification payload 310 can be validated to determine whether to store the data modification payload 310 in the first data cache or the second data cache of the data queue 305. Based on one or more data attributes associated with the data modification payload 310, a data ingestion specification 634 can be generated for the data modification payload 310 to facilitate modification of data in the time series database 306. For example, the data ingestion specification 634 can be configured to modify a portion of the data for an interval of time in the time series database 306 that corresponds to a segment start time and a segment end time included in the data modification payload 310, where the portion of data is modified using via the modification type 630 included in the data modification payload 310.

In one or more embodiments, the streaming enricher 608 can decompress data of the data modification payload 310 prior to calling the configuration API 632. In one or more embodiments, the configuration API 632 can be executed to parse the data modification payload 310 to extract segment timelines from the data modification payload 310. In one or more embodiments, the configuration API 632 can be executed to parse a header of the data modification payload 310 to determine the modification type 630. In one example, in response to a determination that the modification type 630 corresponds to a delete operation, the configuration API 632 can construct the data ingestion specification 634 as a delete transform specification. In another example, in response to a determination that the modification type 630 corresponds to an update operation, the configuration API 632 can construct the data ingestion specification 634 as an update transform specification. The data modification payload 310 can additionally be parsed to extract data attributes, translate a customer identifier data source creation, determine a data object type for a data payload associated with a modification, etc. The data attributes, customer identifier, data object type, and/or other data can be included in the data ingestion specification 634 to facilitate modification of the data in the time series database 306. In one or more embodiments, the data ingestion specification 634 can be ingested directly into the time series database 306. Alternatively, the data ingestion specification 634 can be ingested based on capacity criteria for the time series database 306 to determine whether the request can be successfully processed. For example, the data ingestion specification 634 can be ingested based on a status of the data modification payload 310 as determined by the data queue 305.

In one or more embodiments, the streaming enricher 608 can assign a tracking identifier to the data modification payload 310 to facilitate storage of the data modification payload 310 in the data queue 305. For example, the tracking identifier can be utilized to determine a status of a modification operation for the data modification payload 310 with respect to the time series database 306. In response to a determination that a modification operation for the data modification payload 310 is successfully executed, then the data modification payload 310 can be removed from the data queue 305. However, in response to a determination that modification operation for the data modification payload 310 is successfully executed, a retry mechanism can be correlated to the tracking identifier for the data modification payload 310 and/or the data modification payload 310 can be maintained in a portion of the data queue 305 associated with a processing cache. In certain embodiments, in response to a retry mechanism, the streaming enricher 608 can generate a new tracking identifier for the data modification payload 310. For example, the original tracking identifier for the data modification payload 310 can be augmented with a suffix to indicate the retry status for the data modification payload 310.

In one or more embodiments, the data modification payload 310 undergoing a retry can be stored in the second data cache of the data queue 305. For example, the second data cache of the data queue 305 can be configured as a data source cache that tracks a list of segment time intervals and/or a data source identifier currently being processed with respect to the time series database 306. The second data cache of the data queue 305 can additionally be configured to maintain a list of tracking identifiers for data modification payloads awaiting ingestion into the time series database 306. In one or more embodiments, respective tracking identifiers can be correlated with a time to live (TTL) indicator to limit an amount of time that a data modification payload is stored in the second data cache of the data queue 305. In one or more embodiments, respective tracking identifiers can be correlated with a defined data ingestion specification for a respective data modification payload. In certain embodiments, the data queue 305 can utilize a separate data cache such as, for example, a tracking identifier cache, to maintain the list of tracking identifiers.

Figure 7:
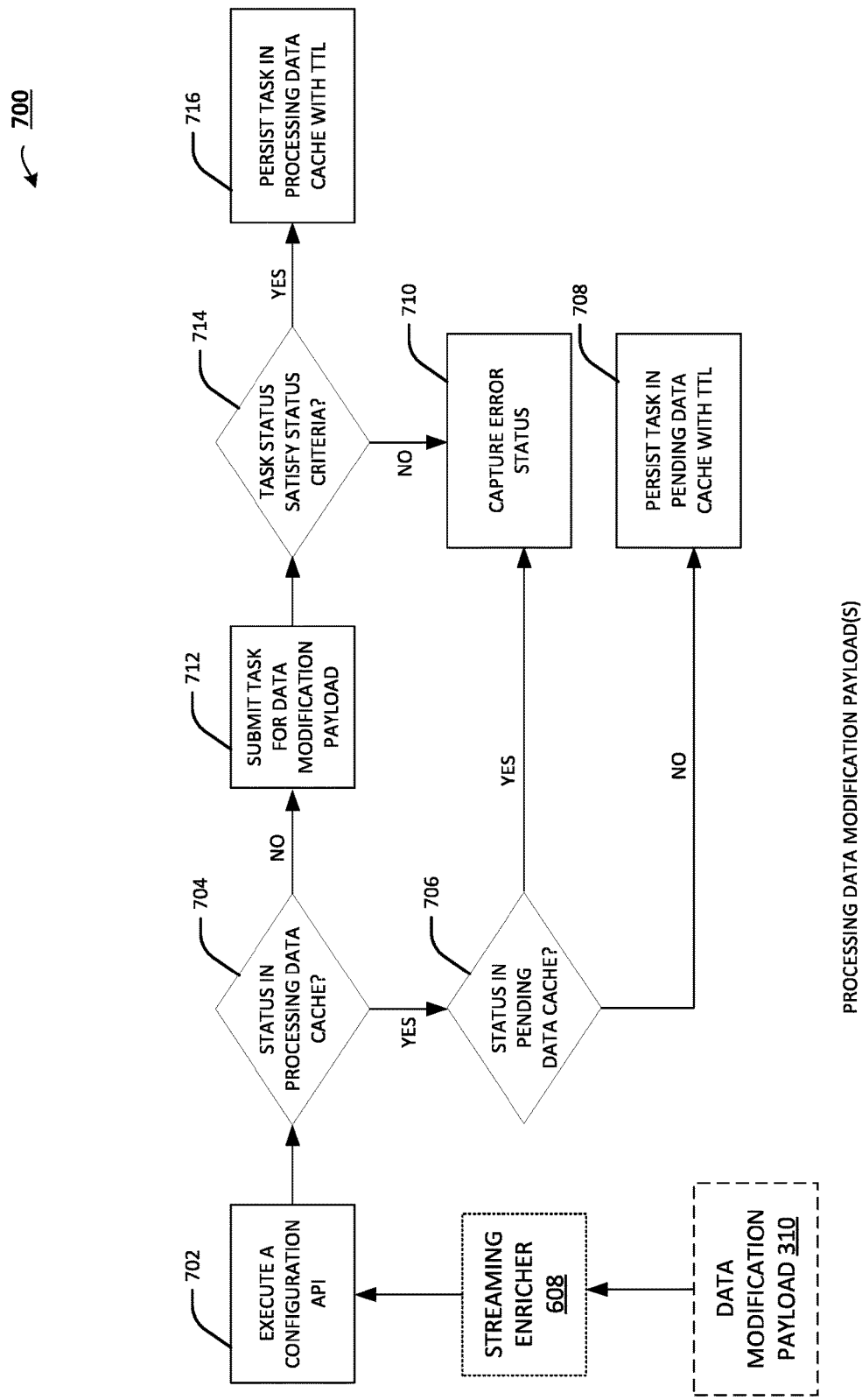
FIG. 7 illustrates an exemplary process flow diagram for processing data modification payloads, in accordance with one or more embodiments described herein.

FIG. 7 illustrates a process flow diagram 700 for processing data modification payloads, in accordance with one or more embodiments described herein. In one or more embodiments, the process flow diagram 700 is associated with the database management system 302. Additionally or alternatively, in various embodiments, the process flow diagram 700 is associated with the streaming enricher 608. In one or more embodiments, the process flow diagram 700 begins at block 702 that executes a configuration API (e.g., the configuration API 632) in response to the data modification payload 310 being received by the streaming enricher 608. The process flow diagram 700 also includes a block 704 that determines a status in a processing data cache for the data modification payload 310. If the status (e.g., a tracking identifier) is stored in the processing data cache, the process flow diagram 700 proceeds to block 706. However, if the status is not stored in the processing data cache, the process flow diagram 700 proceeds to block 712.

The block 706 determines a status in a pending data cache for the data modification payload 310. If the status (e.g., a tracking identifier) is not stored in the pending data cache, the task for the data modification payload 310 is persisted in the pending data cache with a TTL at block 708. However, if the status (e.g., a tracking identifier) is stored in the pending data cache, an error status is captured at block 710. The block 712 submits a task for the data modification payload 310. After block 712, the process flow diagram 700 includes a block 714 that determines whether a task status satisfies status criteria. If yes, the task for the data modification payload 310 is persisted in the processing data cache with a TTL at block 716. However, if no, an error status is captured at block 710.

Figure 8:
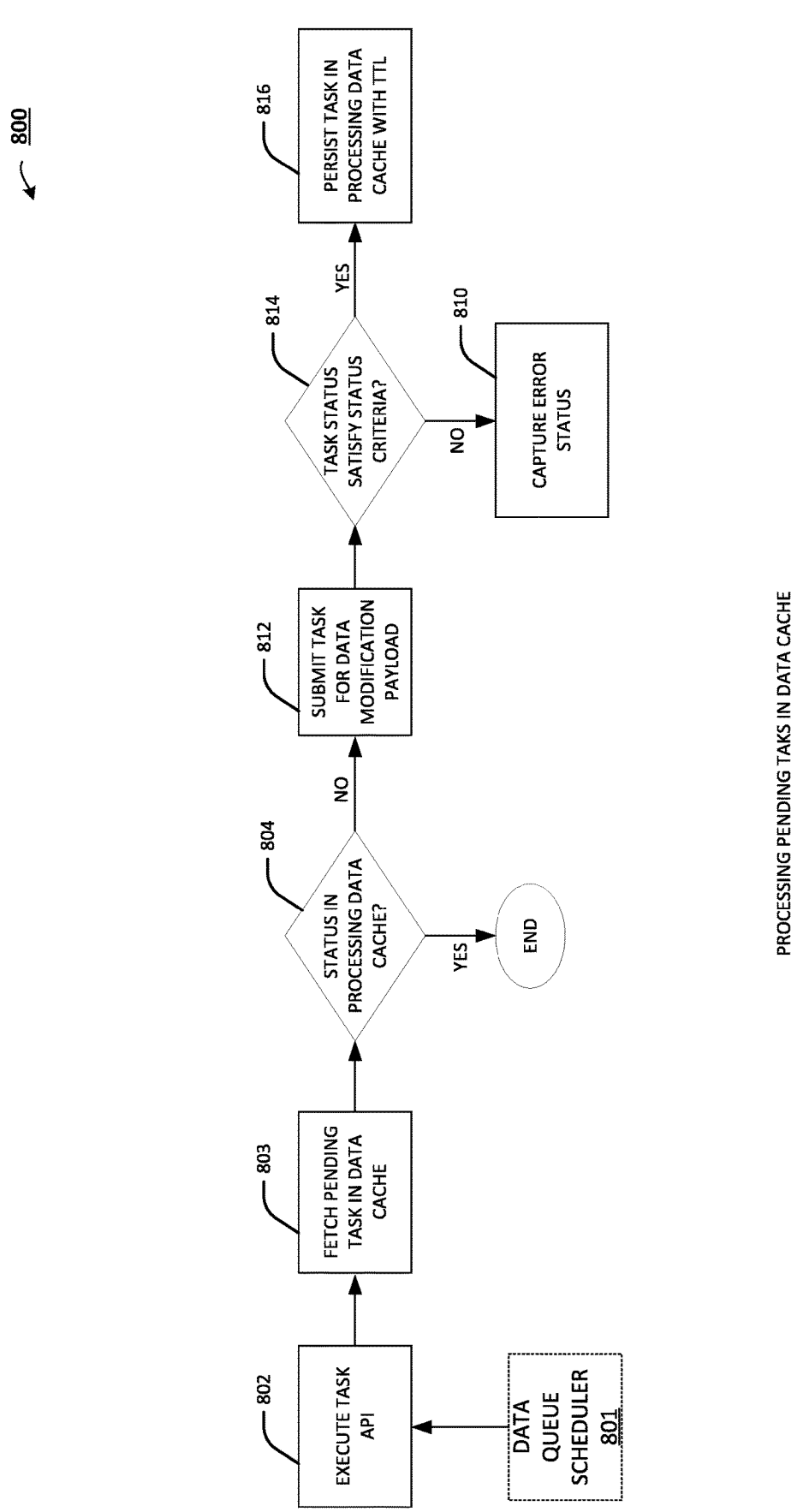
FIG. 8 illustrates an exemplary process flow diagram for processing pending tasks in a data cache, in accordance with one or more embodiments described herein.

FIG. 8 illustrates a process flow diagram 800 for processing pending tasks for data modification payloads in a data cache, in accordance with one or more embodiments described herein. In one or more embodiments, the process flow diagram 800 is associated with the database management system 302. Additionally or alternatively, in various embodiments, the process flow diagram 800 is associated with the streaming enricher 608. In one or more embodiments, the process flow diagram 800 begins at block 802 that executes a task API (e.g., a task API of the configuration API 632). The task API can be initiated and/or managed by a data queue scheduler 801 of the streaming enricher 608. The process flow diagram 800 also includes a block 803 that fetches a pending task for a data modification payload in a data cache. The data cache can be the processing data cache or the pending data cache. The process flow diagram 800 also includes a block 804 that determines a status in a processing data cache for the data modification payload. If the status (e.g., a tracking identifier) is stored in the processing data cache, the process flow diagram 800 ends. However, if the status is not stored in the processing data cache, the process flow diagram 800 proceeds to block 812. The block 812 submits a task for the data modification payload. After block 812, the process flow diagram 800 includes a block 814 that determines whether a task status satisfies status criteria. If yes, the task for the data modification payload is persisted in the processing data cache with a TTL at block 816. However, if no, an error status is captured at block 810.

Figure 9:
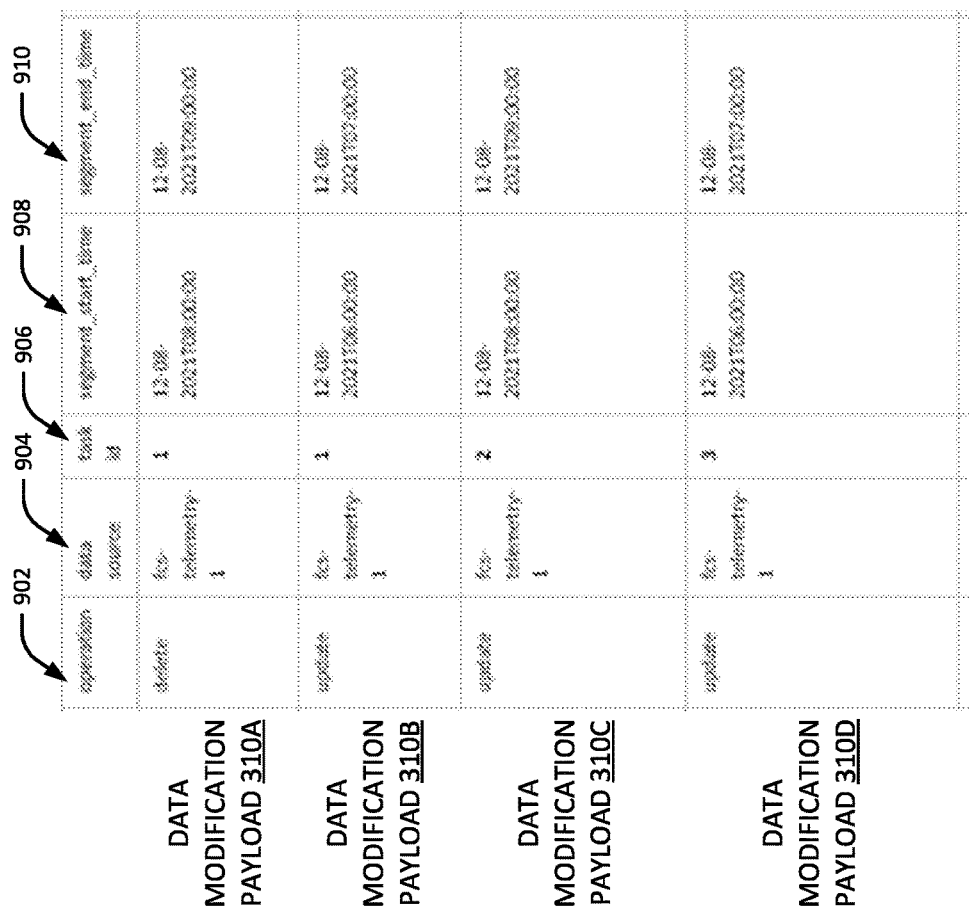
FIG. 9 illustrates an exemplary data modification payloads, in accordance with one or more embodiments described herein.

FIG. 9 illustrates exemplary data modification payloads, in accordance with one or more embodiments described herein. For example, FIG. 9 illustrates a first data modification payload 310A, a second data modification payload 310B, a third data modification payload 310C, and a fourth data modification payload 310D. The first data modification payload 310A, second data modification payload 310B, third data modification payload 310C, a fourth data modification payload 310D can respectively include a payload that includes an operation type 902, a data source identifier 904, a task identifier 906, a segment start time 908, and/or a segment end time 910. The operation type 902 can correspond to a modification type (e.g., delete, update, copy, insert, etc.), the data source identifier 904 can correspond to an identifier for a particular portion of the time series database 306, the task identifier 906 can identify a task associated with a data modification payload, the segment start time 908 can identify a start time for a portion of time series data to be modified, and segment end time 910 can identify an end time for a portion of time series data to be modified.

Figure 10:
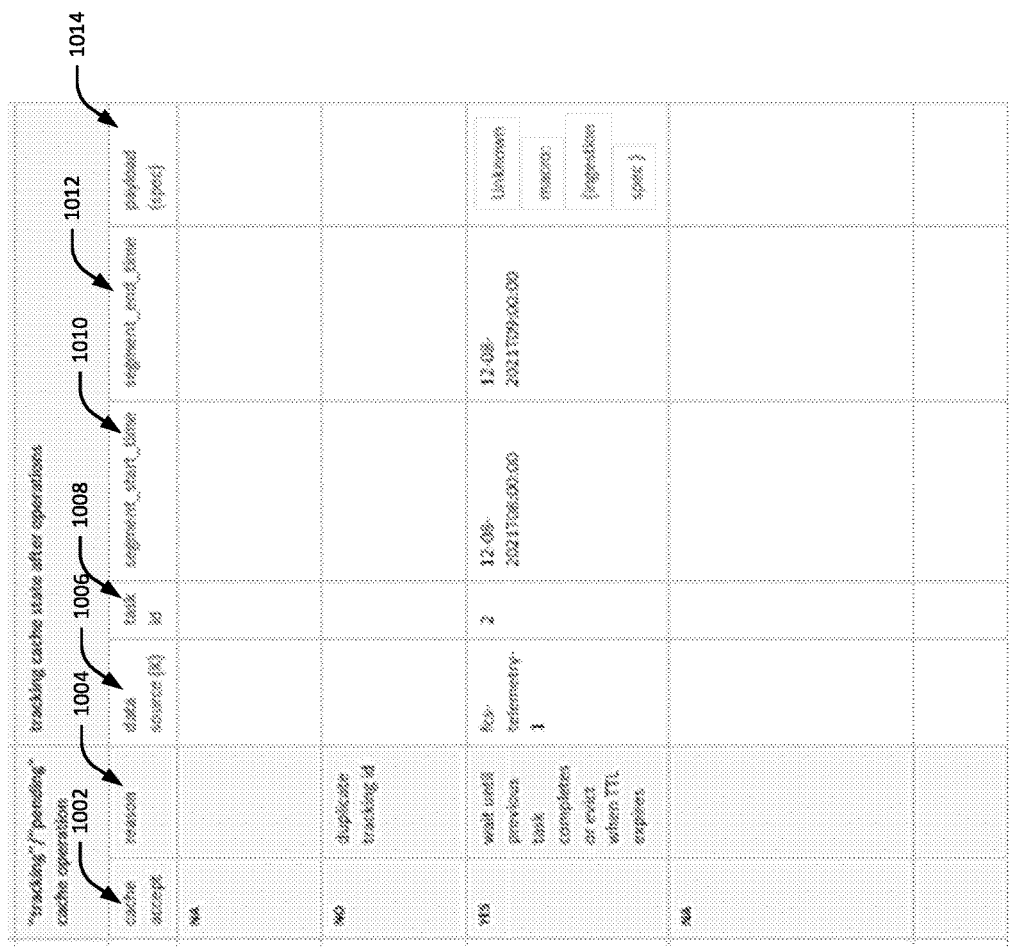
FIG. 10 illustrates an exemplary first data cache, in accordance with one or more embodiments described herein.

FIG. 10 illustrates an exemplary first data cache 1000, in accordance with one or more embodiments described herein. The first data cache 1000 can be configured as a pending data cache. For example, the first data cache 1000 can be configured to store pending data modification payloads and/or information associated therewith. In one or more embodiments, the first data cache 1000 can store an indication 1002 as to whether the first data cache 1000 accepted a data modification payload for storage, a reason 1004 as to whether or not the first data cache 1000 accepted a data modification payload for storage, a data source identifier 1006 for a data modification payload, a task identifier 1008 for a data modification payload, a segment start time 1010 for a data modification payload, a segment end time 1012 for a data modification payload, and/or a payload 1014 for a data modification payload. The payload 1014 can be, for example, data and/or a data ingestion specification to modify the time series database 306.

Figure 11:
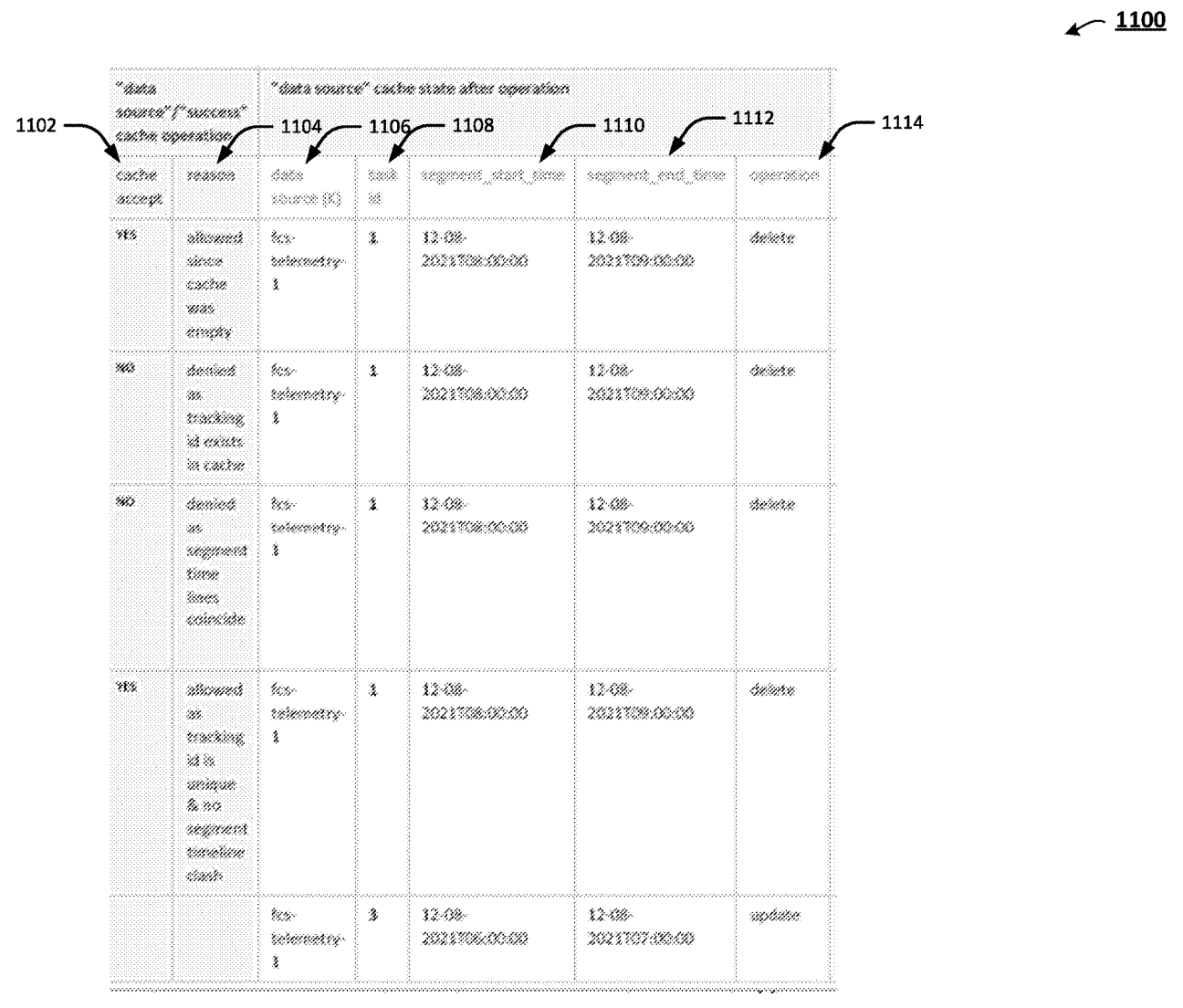

FIG. 11 illustrates an exemplary second data cache 1100, in accordance with one or more embodiments described herein. The second data cache 1100 can be configured as a processing data cache. For example, the second data cache 1100 can be configured to store pending data modification payloads deemed ready for processing and/or information associated therewith. In one or more embodiments, the second data cache 1100 can store an indication 1102 as to whether the second data cache 1100 accepted a data modification payload for storage, a reason 1104 as to whether or not the second data cache 1100 accepted a data modification payload for storage, a data source identifier 1106 for a data modification payload, a task identifier 1108 for a data modification payload, a segment start time 1110 for a data modification payload, a segment end time 1112 for a data modification payload, and/or an operation type 1114 for a data modification payload. The operation type 1114 can correspond to a modification type (e.g., delete, update, copy, insert, etc.) to be performed with respect to the time series database 306 based on a data payload for the data modification payload.

Figure 12:
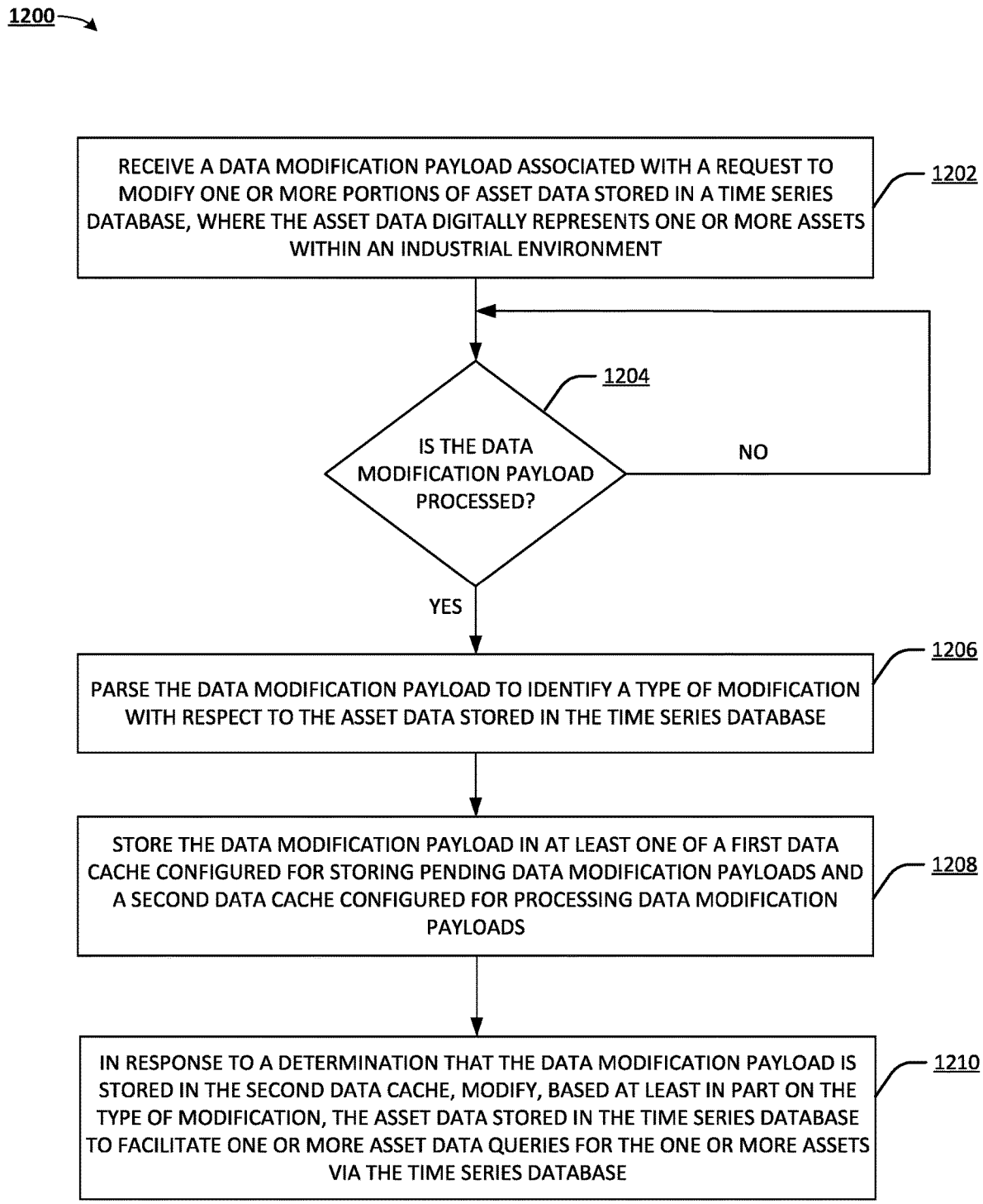
FIG. 12 illustrates a flow diagram for managing a database to modify data related to industrial assets using an intelligent data queue for data ingestion, in accordance with one or more embodiments described herein.

FIG. 12 illustrates a method 1200 for managing a database to modify data related to industrial assets using an intelligent data queue for data ingestion, in accordance with one or more embodiments described herein. The method 1200 is associated with the database management system 302, for example. For instance, in one or more embodiments, the method 1200 is executed at a device (e.g., the database management system 302) with one or more processors and a memory. In one or more embodiments, the method 1200 begins at block 1202 that receives (e.g., by the data modification payload component 404) a data modification payload associated with a request to modify one or more portions of asset data stored in a time series database, where the asset data digitally represents one or more assets within an industrial environment. At block 1204, it is determined whether the data modification payload is processed. For example, it can be determined whether data can be successfully extracted from the data modification payload. If no, block 1204 is repeated to determine whether the data modification payload is processed. If yes, the method 1200 proceeds to block 1206. In response to the data modification payload, block 1206 parses (e.g., by the data modification payload component 404) the data modification payload to identify a type of modification with respect to the asset data stored in the time series database. Additionally, block 1208 stores (e.g., by the data queue component 406) the data modification payload in at least one of a first data cache configured for storing pending data modification payloads and a second data cache configured for processing data modification payloads. In response to a determination that the data modification payload is stored in the second data cache, block 1210 modifies (e.g., by the database component 408) the asset data stored in the time series database based at least in part on the type of modification to facilitate one or more asset data queries for the one or more assets via the time series database.

In one or more embodiments, the method 1200 additionally or alternatively includes parsing the data modification payload to identify one or more data attributes associated with the data modification payload. In one or more embodiments, the method 1200 additionally or alternatively includes, in response to the determination that the data modification payload is stored in the second data cache, modifying the asset data stored in the time series database based at least in part on the type of modification and the one or more data attributes.

In one or more embodiments, the method 1200 additionally or alternatively includes parsing the data modification payload to identify a data source identifier associated with the time series database. In one or more embodiments, the method 1200 additionally or alternatively includes, in response to the determination that the data modification payload is stored in the second data cache, modifying the asset data stored in the time series database based at least in part on the type of modification and the data source identifier.

In one or more embodiments, the method 1200 additionally or alternatively includes parsing the data modification payload to identify a start time for an interval of time associated with the asset data stored in the time series database. In one or more embodiments, the method 1200 additionally or alternatively includes parsing the data modification payload to identify an end time for the interval of time associated with the asset data stored in the time series database. In one or more embodiments, the method 1200 additionally or alternatively includes, in response to the determination that the data modification payload is stored in the second data cache, modifying the asset data stored in the time series database based at least in part on the type of modification and the interval of time associated with the start time and the end time.

In one or more embodiments, the method 1200 additionally or alternatively includes storing the data modification payload in the first data cache in response to a determination that the data modification payload conflicts with another data modification payload stored in the second data cache.

In one or more embodiments, the method 1200 additionally or alternatively includes moving the data modification payload stored in the first data cache into the second data cache in response to a determination that the data modification payload does not conflict with another data modification payload stored in the second data cache.

In one or more embodiments, the method 1200 additionally or alternatively includes storing the data modification payload in the first data cache in response to a determination that one or more data attributes and/or a data source of the data modification payload conflicts with at least one data attribute of another data modification payload stored in the second data cache.

In one or more embodiments, the method 1200 additionally or alternatively includes storing the data modification payload in the first data cache in response to a determination that an interval of time for modifying data associated with the data modification payload conflicts with another data modification payload stored in the second data cache.

Figure 13:
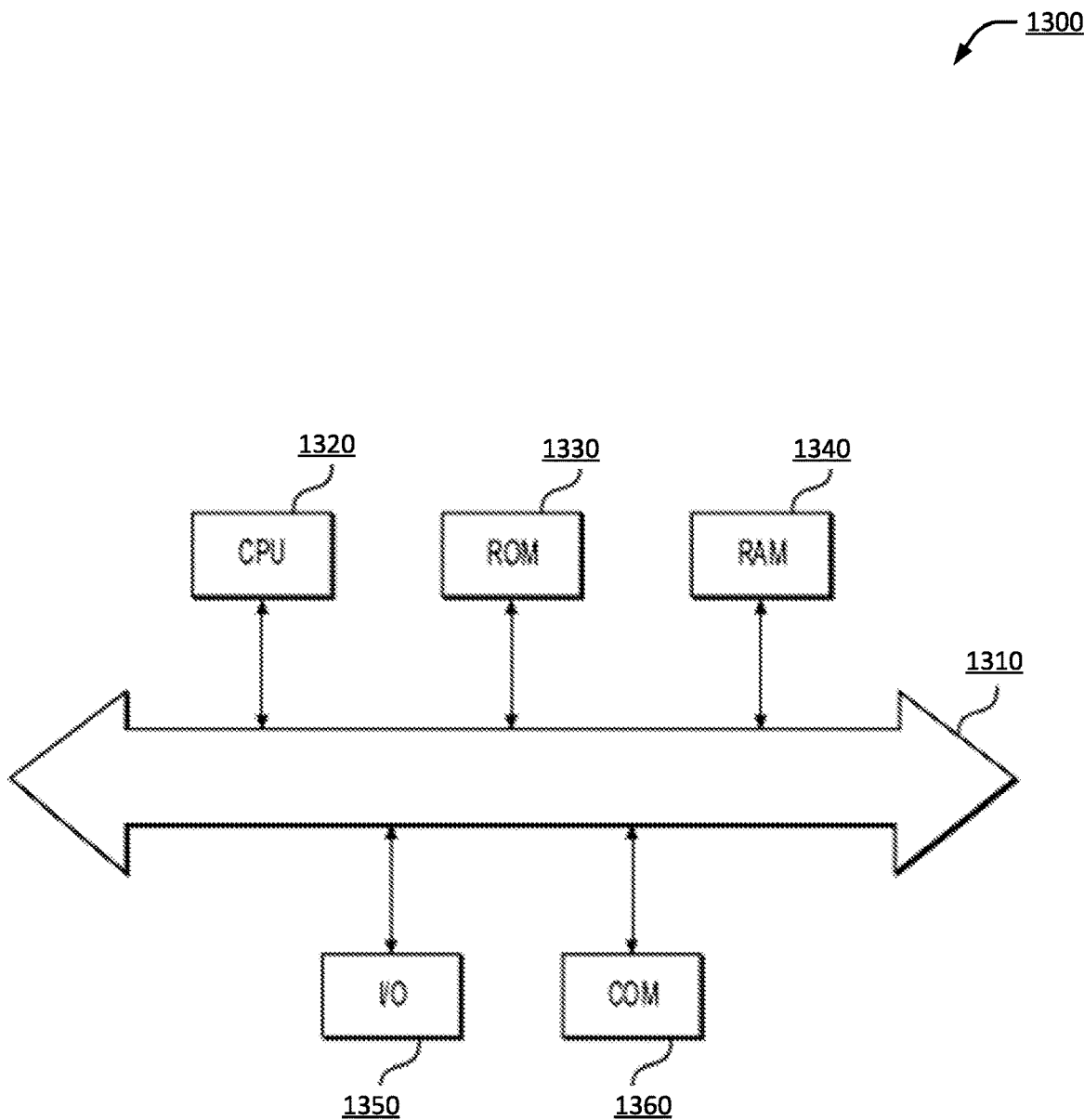
FIG. 13 illustrates a functional block diagram of a computer that may be configured to execute techniques described in accordance with one or more embodiments described herein.

FIG. 13 depicts an example system 1300 that may execute techniques presented herein. FIG. 13 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1360 for packet data communication. The platform also may include a central processing unit ("CPU") 1320, in the form of one or more processors, for executing program instructions. The platform may include an internal communication bus 1310, and the platform also may include a program storage and/or a data storage for various data files to be processed and/or communicated by the platform such as ROM 1330 and RAM 1340, although the system 1300 may receive programming and data via network communications. The system 1300 also may include input and output ports 1350 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic waves, a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™ or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
   one or more processors;
   a memory; and
   one or more programs stored in the memory, the one or more programs comprising instructions configured to:
   receive a data modification payload associated with a request to modify one or more portions of asset data stored in a time series database, wherein the asset data digitally represents one or more assets within an industrial environment;
   parse the data modification payload to identify a type of modification with respect to the asset data stored in the time series database;
   store the data modification payload in at least one of a first data cache configured for storing pending data modification payloads and a second data cache configured for processing data modification payloads; and
   in response to a determination that the data modification payload is stored in the second data cache, modify, based at least in part on the type of modification, the asset data stored in the time series database to facilitate one or more asset data queries for the one or more assets via the time series database.

2. The system of claim 1, the one or more programs further comprising instructions configured to:
   parse the data modification payload to identify one or more data attributes associated with the data modification payload; and
   in response to the determination that the data modification payload is stored in the second data cache, modify the asset data stored in the time series database based at least in part on the type of modification and the one or more data attributes.

3. The system of claim 1, the one or more programs further comprising instructions configured to:
   parse the data modification payload to identify a data source identifier associated with the time series database; and
   in response to the determination that the data modification payload is stored in the second data cache, modify the asset data stored in the time series database based at least in part on the type of modification and the data source identifier.

4. The system of claim 1, the one or more programs further comprising instructions configured to:
   parse the data modification payload to identify a start time for an interval of time associated with the asset data stored in the time series database;
   parse the data modification payload to identify an end time for the interval of time associated with the asset data stored in the time series database; and
   in response to the determination that the data modification payload is stored in the second data cache, modify the asset data stored in the time series database based at least in part on the type of modification and the interval of time associated with the start time and the end time.

5. The system of claim 1, the one or more programs further comprising instructions configured to:
   store the data modification payload in the first data cache in response to a determination that the data modification payload conflicts with another data modification payload stored in the second data cache.

6. The system of claim 5, the one or more programs further comprising instructions configured to:
   move the data modification payload stored in the first data cache into the second data cache in response to a determination that the data modification payload does not conflict with another data modification payload stored in the second data cache.

7. The system of claim 1, the one or more programs further comprising instructions configured to:
   store the data modification payload in the first data cache in response to a determination that one or more data attributes of the data modification payload conflicts with at least one data attribute of another data modification payload stored in the second data cache.

8. The system of claim 1, the one or more programs further comprising instructions configured to:
   store the data modification payload in the first data cache in response to a determination that a data source associated with the data modification payload conflicts with another data modification payload stored in the second data cache.

9. The system of claim 1, the one or more programs further comprising instructions configured to:
   store the data modification payload in the first data cache in response to a determination that an interval of time for modifying data associated with the data modification payload conflicts with another data modification payload stored in the second data cache.

10. A computer-implemented method comprising:
    receiving a data modification payload associated with a request to modify one or more portions of asset data stored in a time series database, wherein the asset data digitally represents one or more assets within an industrial environment;
    parsing the data modification payload to identify a type of modification with respect to the asset data stored in the time series database;
    storing the data modification payload in at least one of a first data cache configured for storing pending data modification payloads and a second data cache configured for processing data modification payloads; and in response to a determination that the data modification payload is stored in the second data cache, modifying, based at least in part on the type of modification, the asset data stored in the time series database to facilitate one or more asset data queries for the one or more assets via the time series database.

11. The computer-implemented method of claim 10, further comprising:

parsing the data modification payload to identify one or more data attributes associated with the data modification payload; and in response to the determination that the data modification payload is stored in the second data cache, modifying the asset data stored in the time series database based at least in part on the type of modification and the one or more data attributes.

12. The computer-implemented method of claim 10, further comprising:

parsing the data modification payload to identify a data source identifier associated with the time series database; and in response to the determination that the data modification payload is stored in the second data cache, modifying the asset data stored in the time series database based at least in part on the type of modification and the data source identifier.

13. The computer-implemented method of claim 10, further comprising:

parsing the data modification payload to identify a start time for an interval of time associated with the asset data stored in the time series database;

parsing the data modification payload to identify an end time for the interval of time associated with the asset data stored in the time series database; and in response to the determination that the data modification payload is stored in the second data cache, modifying the asset data stored in the time series database based at least in part on the type of modification and the interval of time associated with the start time and the end time.

14. The computer-implemented method of claim 10, further comprising:

storing the data modification payload in the first data cache in response to a determination that the data modification payload conflicts with another data modification payload stored in the second data cache.

15. The computer-implemented method of claim 14, further comprising:

moving the data modification payload stored in the first data cache into the second data cache in response to a determination that the data modification payload does not conflict with another data modification payload stored in the second data cache.

16. The computer-implemented method of claim 10, further comprising:

storing the data modification payload in the first data cache in response to a determination that at least one of one or more data attributes or a data source of the data modification payload conflicts with at least one data attribute of another data modification payload stored in the second data cache.

17. The computer-implemented method of claim 10, further comprising:

storing the data modification payload in the first data cache in response to a determination that an interval of time for modifying data associated with the data modification payload conflicts with another data modification payload stored in the second data cache.

18. A computer program product comprising at least one non-transitory computer-readable storage medium having computer-readable program code portions stored therein, the computer-readable program code portions comprising an executable portion configured to:

receive a data modification payload associated with a request to modify one or more portions of asset data stored in a time series database, wherein the asset data digitally represents one or more assets within an industrial environment;

parse the data modification payload to identify a type of modification with respect to the asset data stored in the time series database;

store the data modification payload in at least one of a first data cache configured for storing pending data modification payloads and a second data cache configured for processing data modification payloads; and in response to a determination that the data modification payload is stored in the second data cache, modify, based at least in part on the type of modification, the asset data stored in the time series database to facilitate one or more asset data queries for the one or more assets via the time series database.

19. The computer program product of claim 18, the computer-readable program code portions further comprising an executable portion configured to:

parse the data modification payload to identify a data source identifier associated with the time series database; and in response to the determination that the data modification payload is stored in the second data cache, modify the asset data stored in the time series database based at least in part on the type of modification and the data source identifier.

20. The computer program product of claim 18, the computer-readable program code portions further comprising an executable portion configured to:

parse the data modification payload to identify a start time for an interval of time associated with the asset data stored in the time series database;

parse the data modification payload to identify an end time for the interval of time associated with the asset data stored in the time series database; and in response to the determination that the data modification payload is stored in the second data cache, modify the asset data stored in the time series database based at least in part on the type of modification and the interval of time associated with the start time and the end time.

* * * * *